United States Patent
Tanaka et al.

(10) Patent No.: US 10,862,594 B2
(45) Date of Patent: Dec. 8, 2020

(54) COMMUNICATION APPARATUS AND COMMUNICATION SYSTEM

(71) Applicant: SONY CORPORATION, Tokyo (JP)

(72) Inventors: Katsuyuki Tanaka, Kanagawa (JP); Fumitaka Kondo, Kanagawa (JP); Moonjae Jeong, Kanagawa (JP); Toru Terashima, Kanagawa (JP); Fumihiro Nishiyama, Saitama (JP)

(73) Assignee: SONY CORPORATION, Tokyo (JP)

( * ) Notice: Subject to any disclaimer, the term of this patent is extended or adjusted under 35 U.S.C. 154(b) by 55 days.

(21) Appl. No.: 16/307,190

(22) PCT Filed: May 16, 2017

(86) PCT No.: PCT/JP2017/018339
§ 371 (c)(1),
(2) Date: Dec. 5, 2018

(87) PCT Pub. No.: WO2017/221590
PCT Pub. Date: Dec. 28, 2017

(65) Prior Publication Data
US 2019/0132059 A1 May 2, 2019

(30) Foreign Application Priority Data

Jun. 20, 2016 (JP) ................. 2016-121716

(51) Int. Cl.
*H04B 13/00* (2006.01)
*H04B 1/59* (2006.01)
(Continued)

(52) U.S. Cl.
CPC .......... *H04B 13/005* (2013.01); *H04B 1/385* (2013.01); *H04B 1/59* (2013.01); *H04B 5/02* (2013.01);
(Continued)

(58) Field of Classification Search
CPC ...... H04W 4/80; H04W 28/0221; H04B 1/59; H04B 13/005; H04B 1/385
See application file for complete search history.

(56) References Cited

U.S. PATENT DOCUMENTS 8,078,100 B2 * 12/2011 Proctor, Jr. ............ H03H 15/00
455/11.1
2008/0259043 A1 * 10/2008 Buil ..................... H04B 13/005
345/173

(Continued)

FOREIGN PATENT DOCUMENTS

JP    2006-080641 A    3/2006
JP    2010-028666 A    2/2010

(Continued)

OTHER PUBLICATIONS

Ruiz et al: "Novel Communication Services Based on Human Body and Environment Interaction: Applications inside Trains and Applications for Handicapped People", IEEE, 2006 (Year: 2006).*

(Continued)

*Primary Examiner* — Omer S Mian
(74) *Attorney, Agent, or Firm* — Chip Law Group

(57) ABSTRACT

A communication system includes one or more communication apparatuses, each including a transmission circuit and a reception circuit. The transmission circuit includes a transmission unit and a signal generator. The transmission unit transmits one of a first transmission signal including first transmission data or a second transmission signal including at least one of a periodic signal with a constant frequency or a narrow band modulation signal having lower speed than the first transmission data. The signal generator generates the second transmission signal. The reception circuit includes a reception unit that receives the first transmission signal and the second transmission signal a narrow band detector that outputs a narrow band detection signal (Continued)

through detecting the second transmission signal in a narrow band, and a determination unit that determines presence of a significant signal or presence of significant signal change in the narrow band detection signal and outputs a determination signal.

17 Claims, 28 Drawing Sheets

(51) Int. Cl.
    *H04B 5/02*     (2006.01)
    *H04W 4/80*     (2018.01)
    *H04B 1/3827*     (2015.01)
    *H04J 3/00*     (2006.01)

(52) U.S. Cl.
    CPC .............. *H04B 13/00* (2013.01); *H04W 4/80* (2018.02); *H04J 3/00* (2013.01); *Y02D 70/20* (2018.01); *Y02D 70/40* (2018.01); *Y02D 70/42* (2018.01)

(56) References Cited

U.S. PATENT DOCUMENTS

| 2010/0022187 | A1 | 1/2010 | Ohkita | |
|---|---|---|---|---|
| 2015/0030103 | A1* | 1/2015 | Hormis | H04L 1/243 375/296 |
| 2016/0050516 | A1* | 2/2016 | Visweswara | H04B 13/005 455/41.2 |
| 2018/0012045 | A1* | 1/2018 | Fujiyoshi | G06F 7/548 |

FOREIGN PATENT DOCUMENTS

| JP | 2010-141469 A | 6/2010 |
|---|---|---|
| JP | 2016-519500 A | 6/2016 |
| WO | 2014/161912 A1 | 10/2014 |

OTHER PUBLICATIONS

Movassaghi et al: "Wireless Body Area Networks: A Survey", IEEE, 2014 (Year: 2014).*
International Search Report and Written Opinion of PCT Application No. PCT/JP2017/018339, dated Aug. 15, 2017, 02 pages of translation and 07 pages of ISRWO.

* cited by examiner

[FIG. 1]
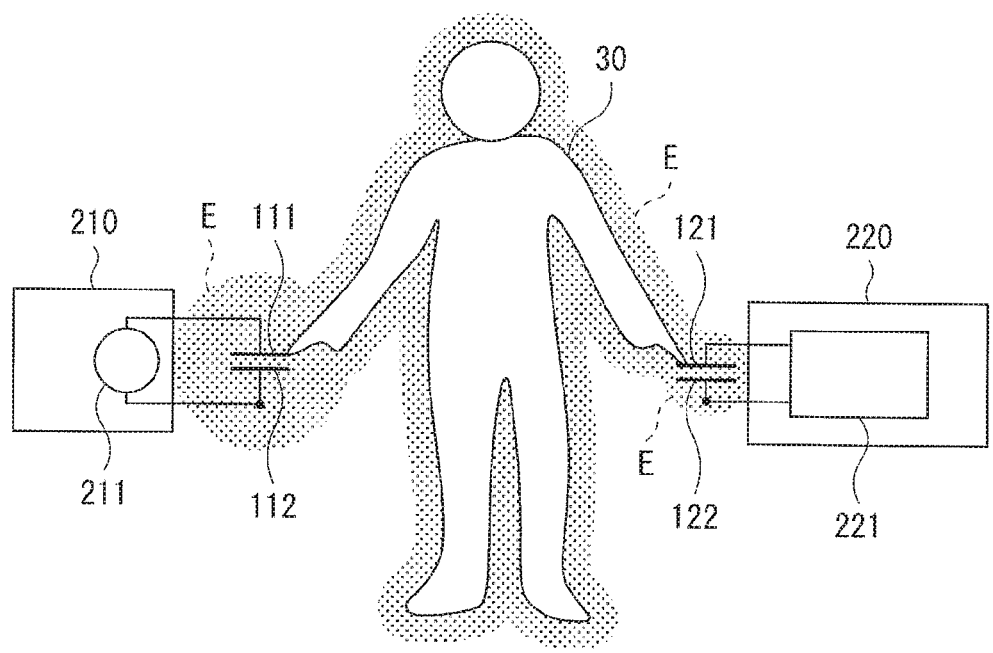
[FIG. 2]
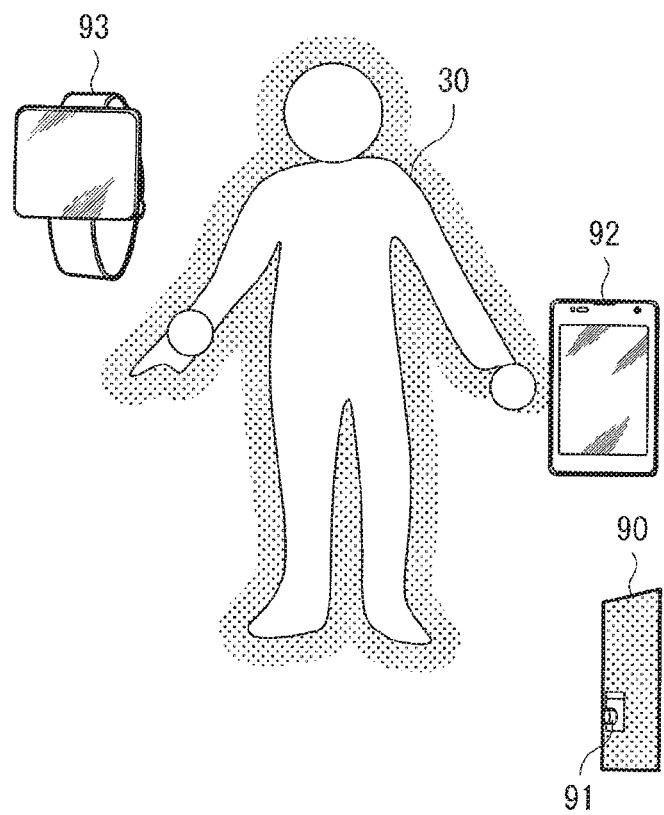

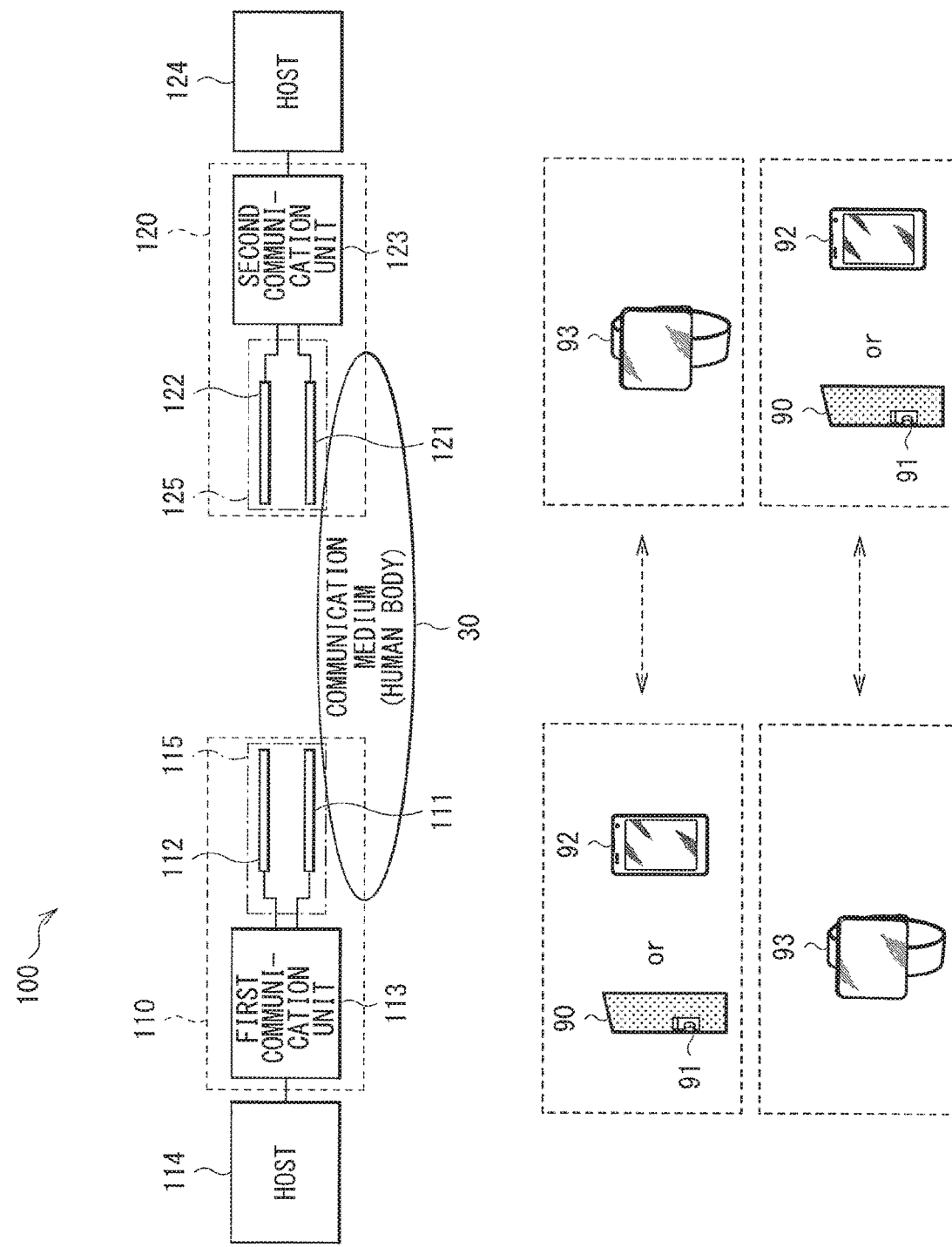

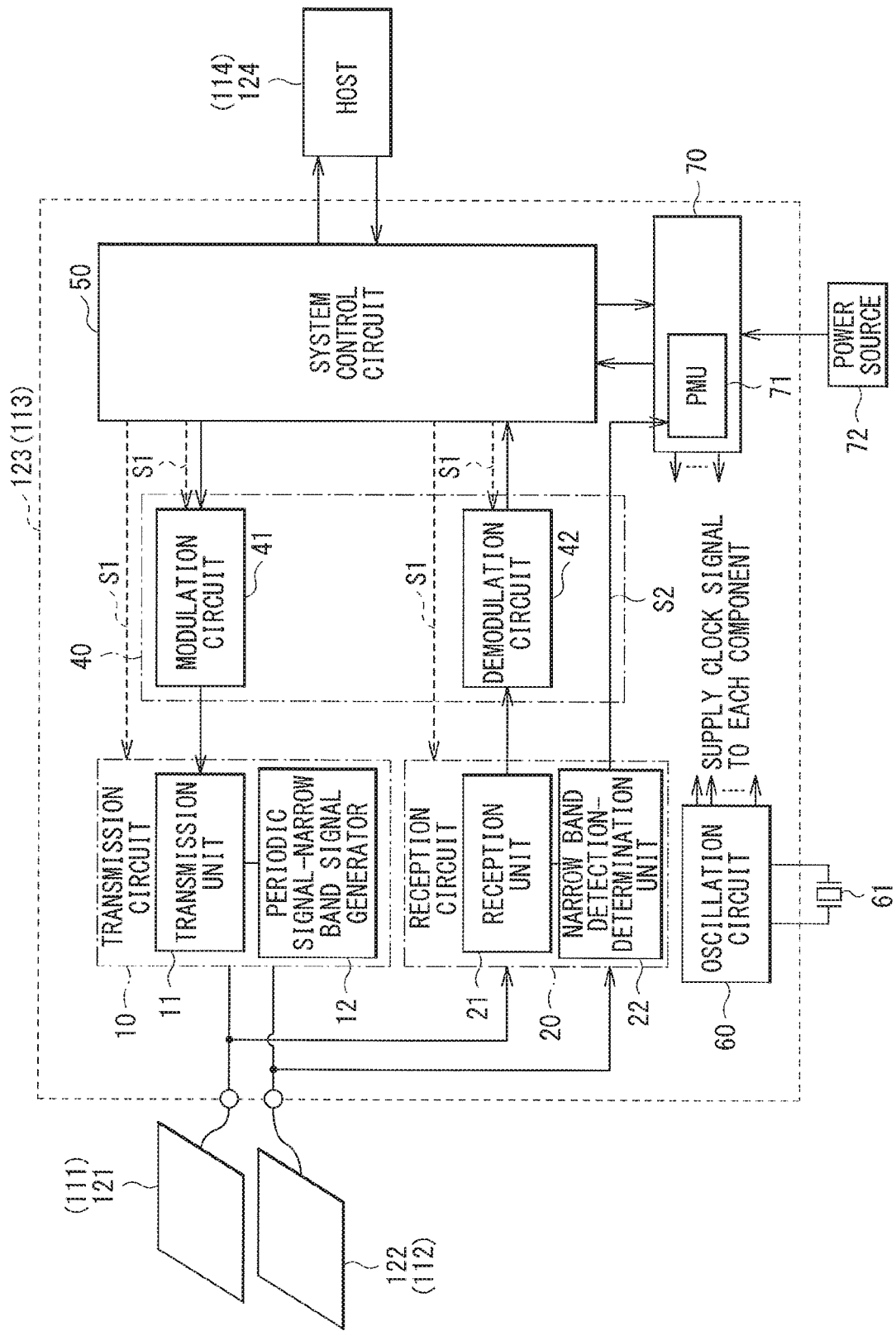

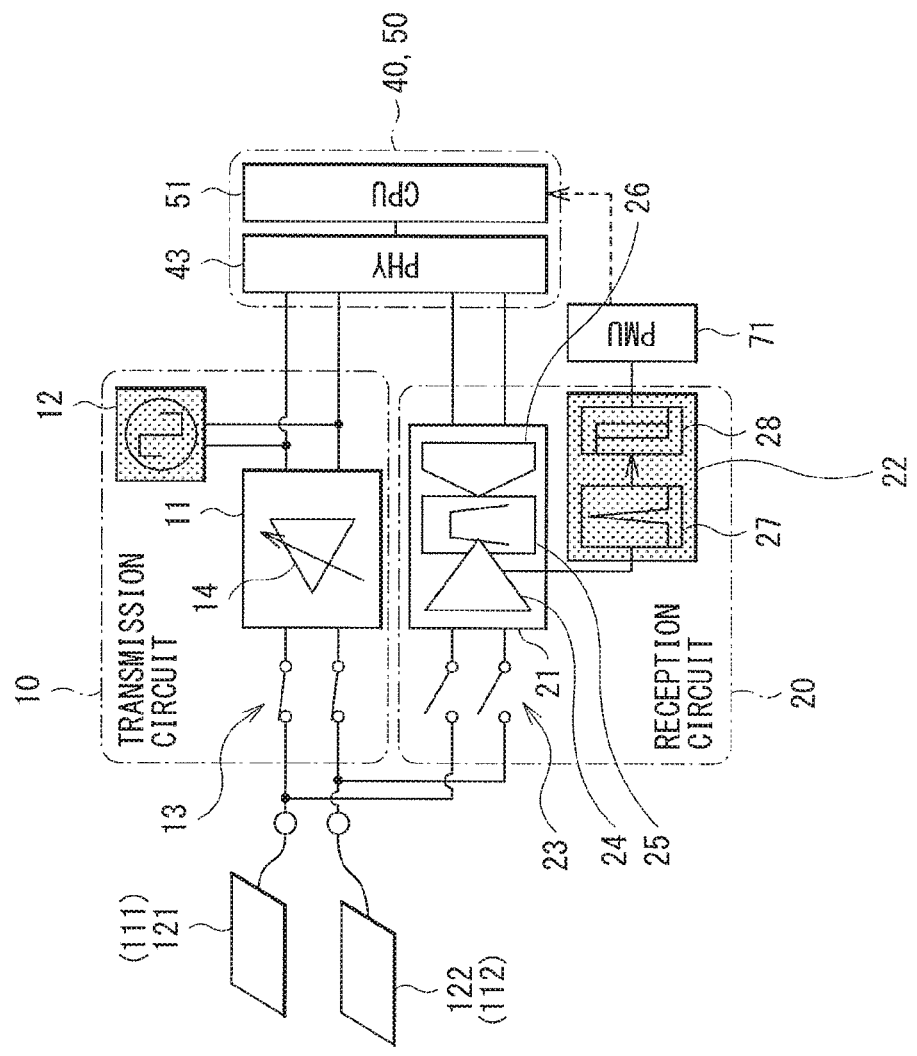
[FIG. 5]

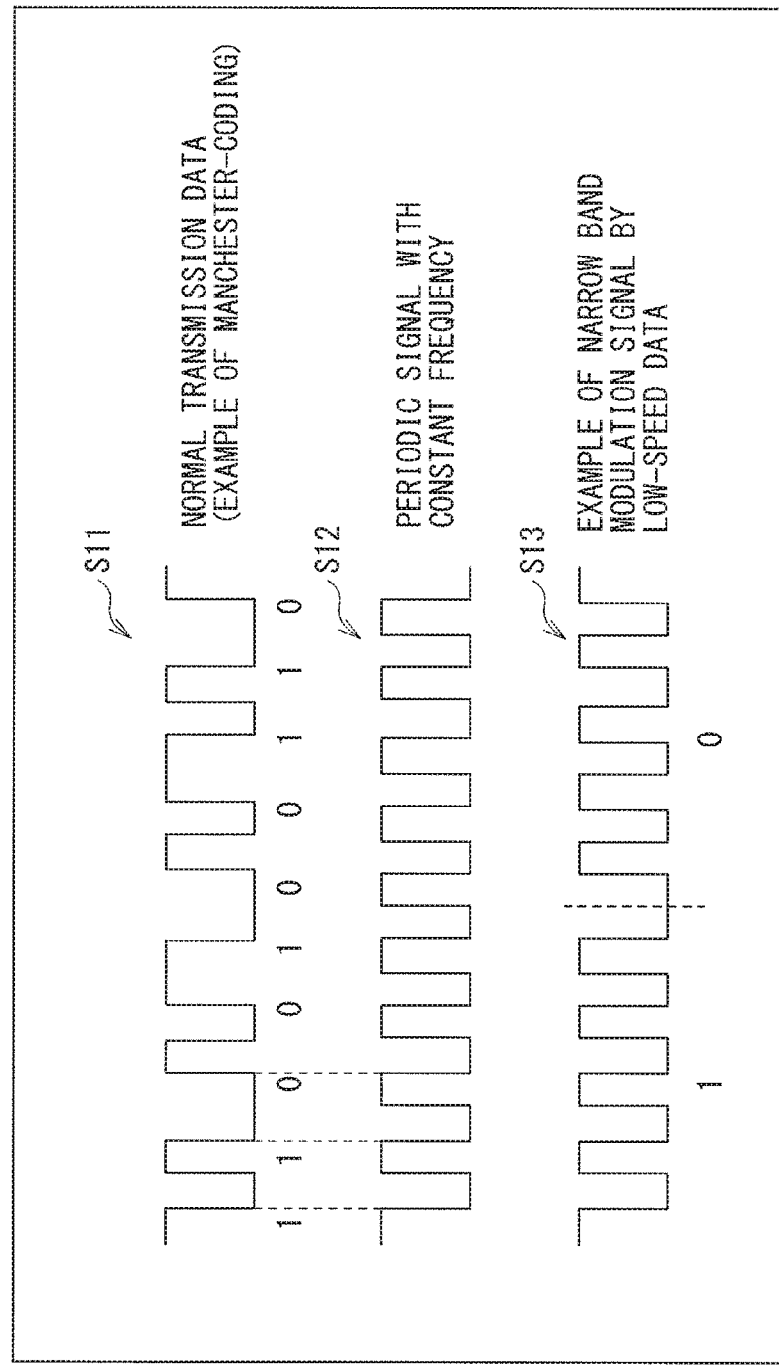

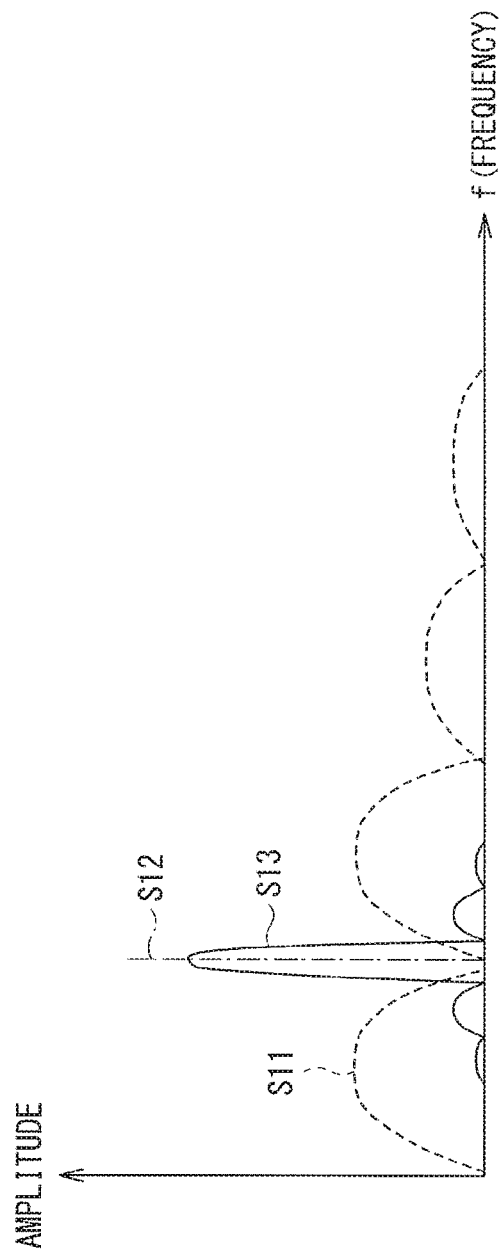

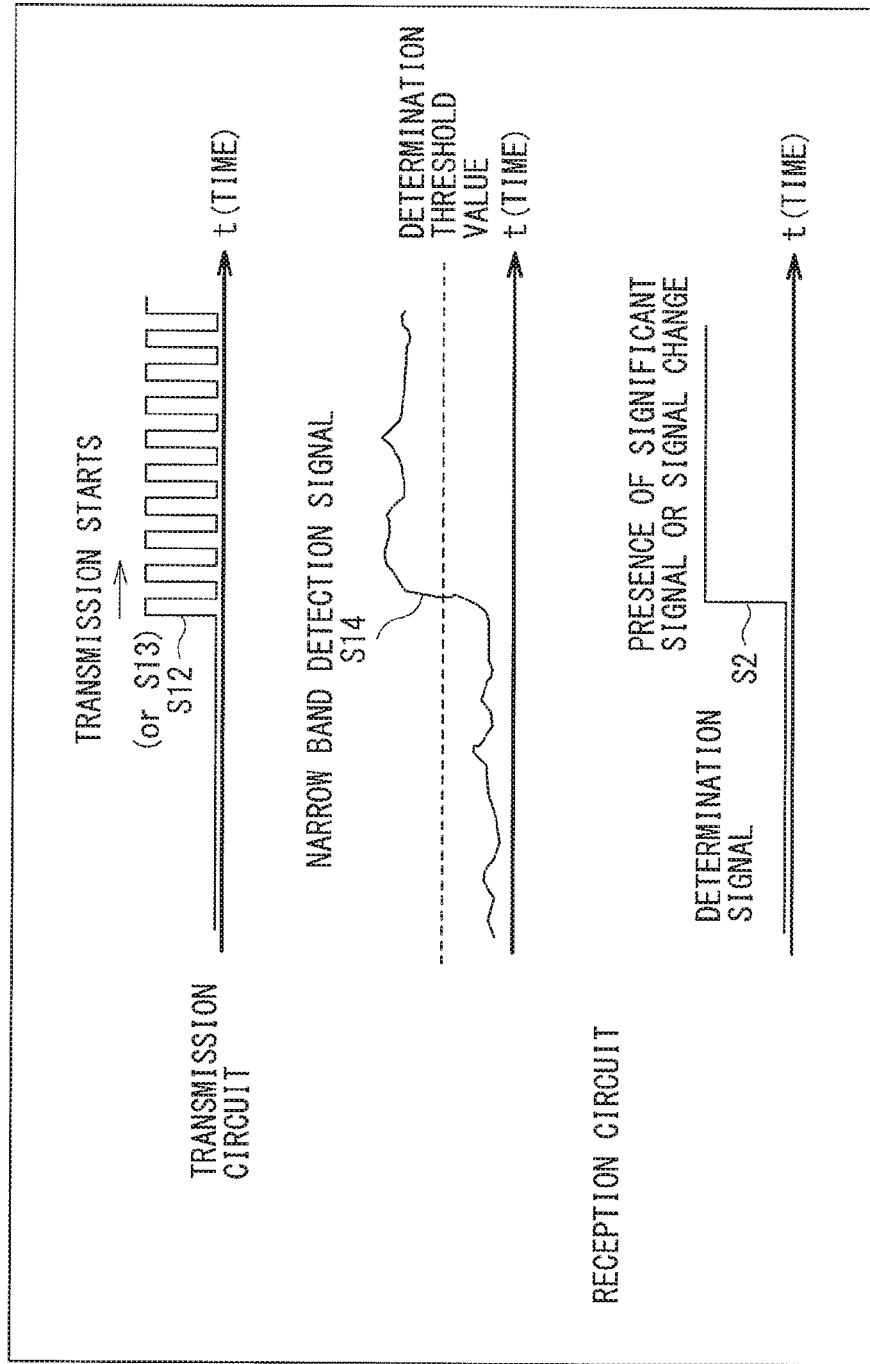
[FIG. 8]

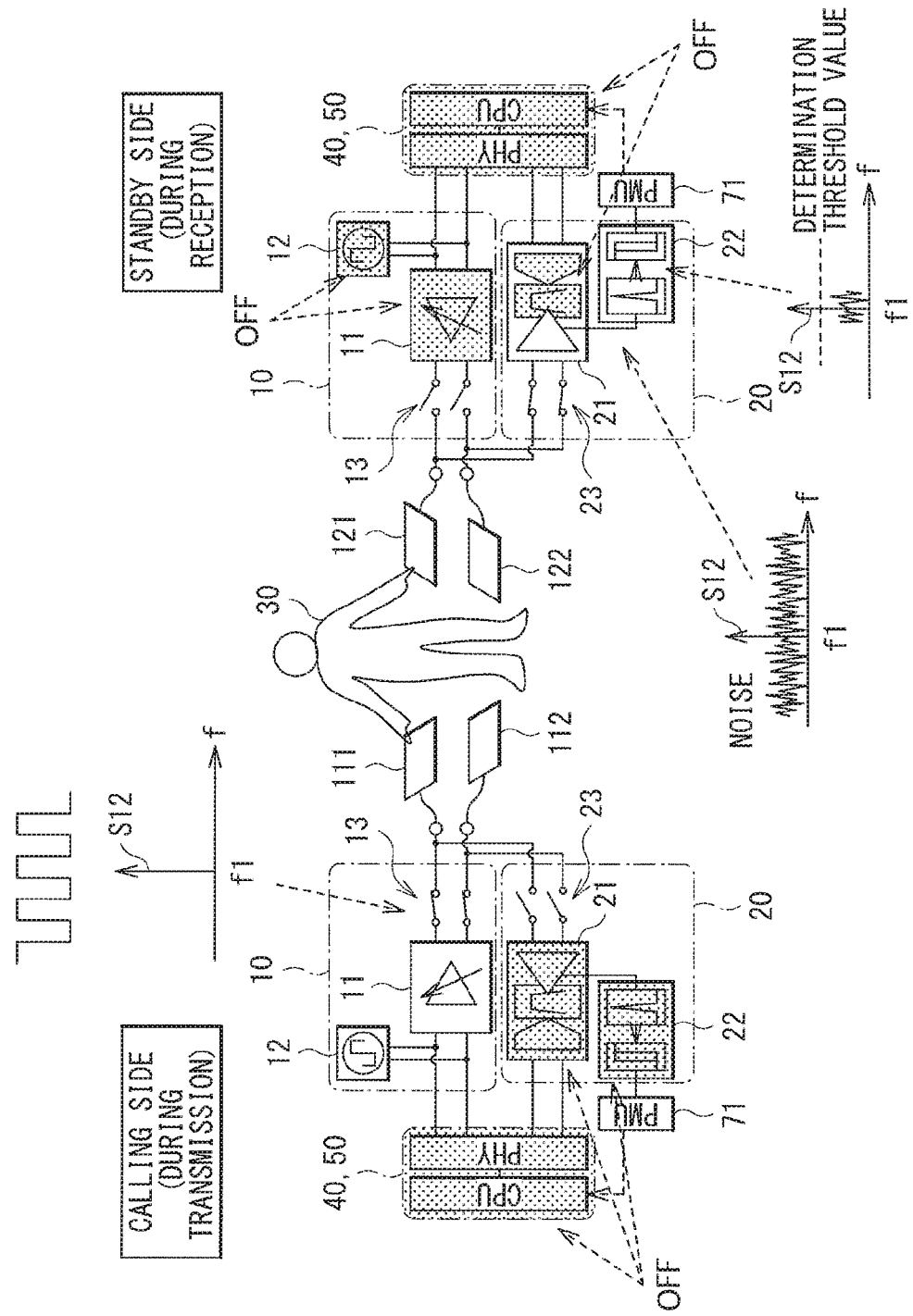
[FIG. 9]

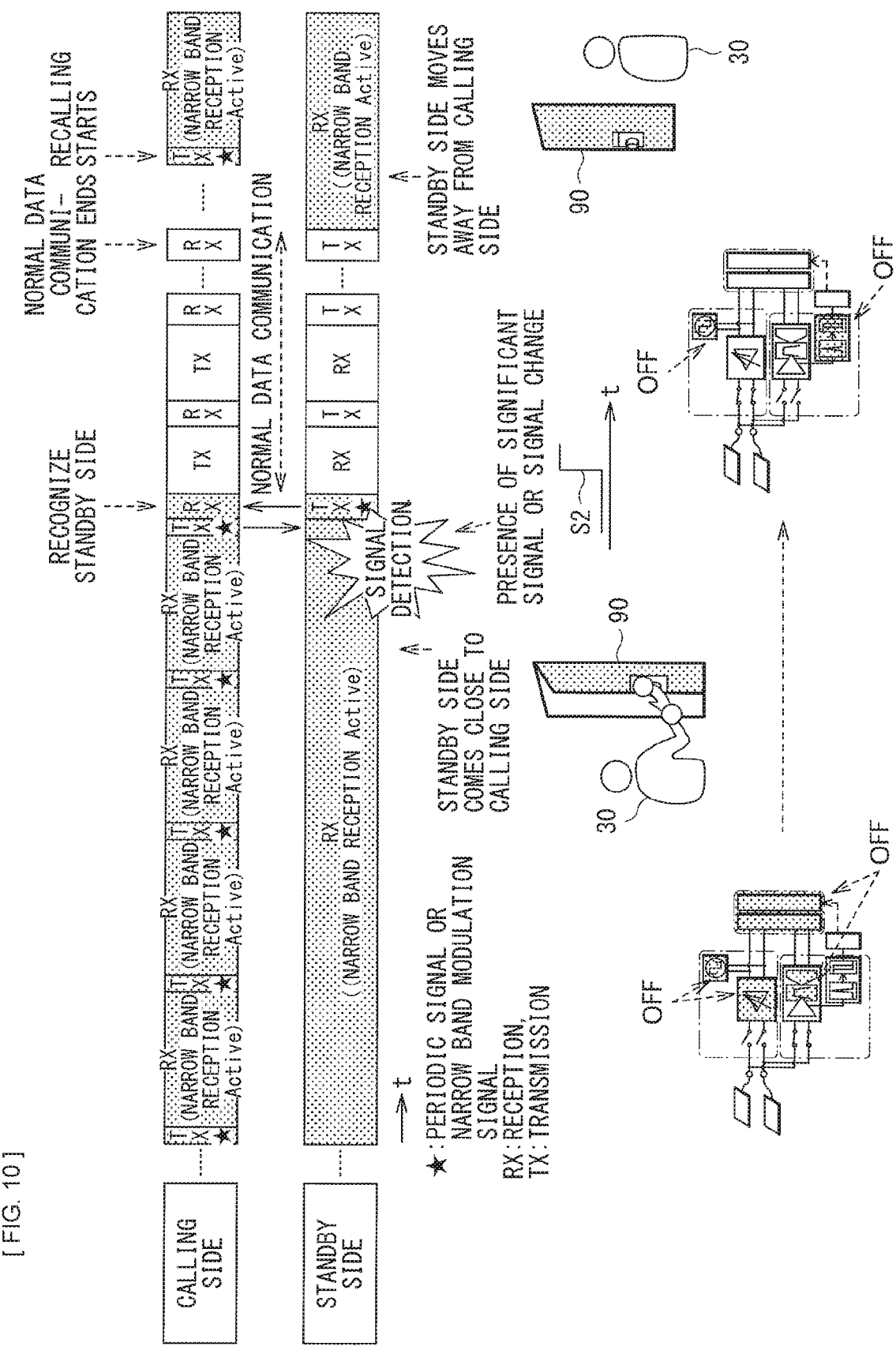
[FIG. 10]

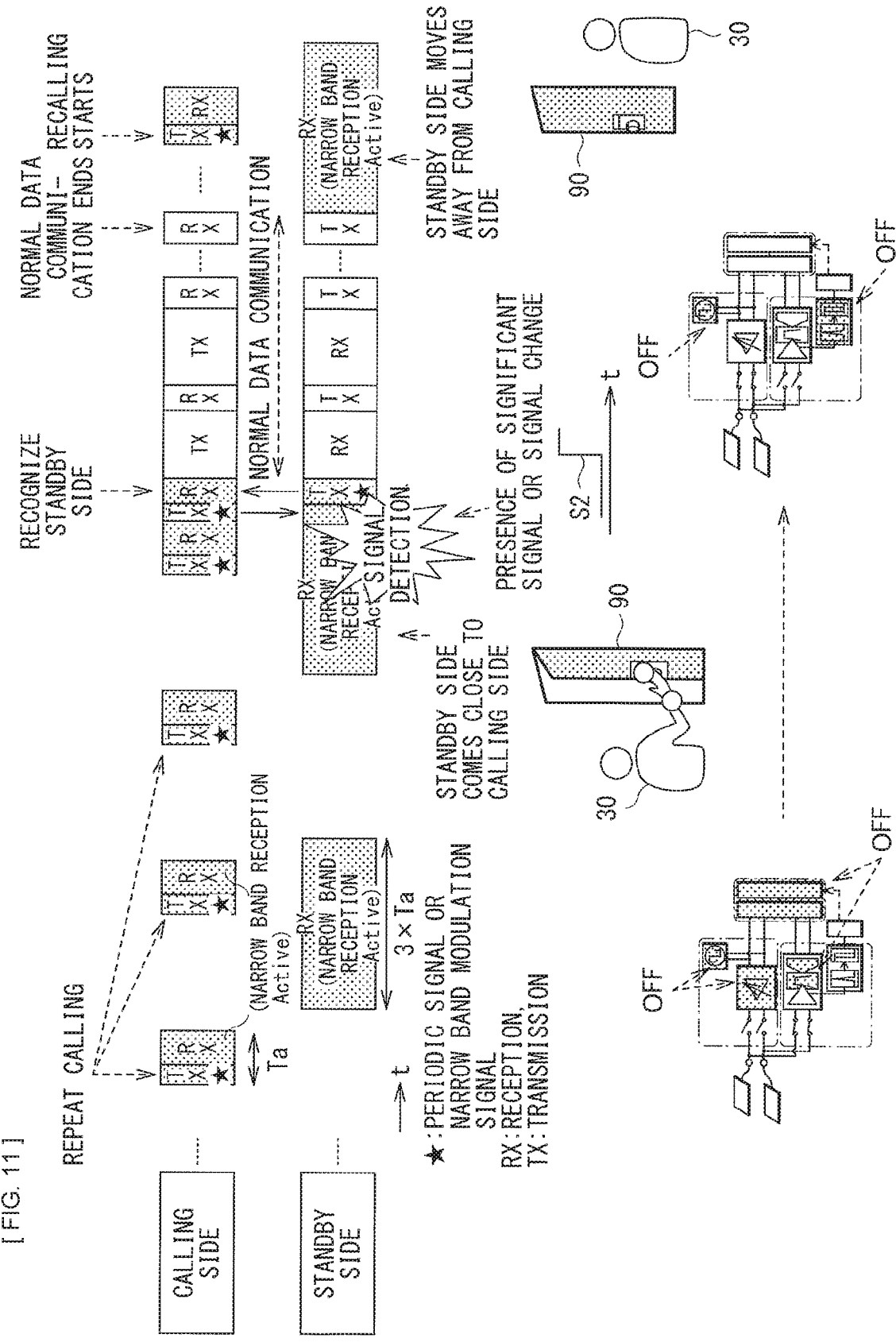

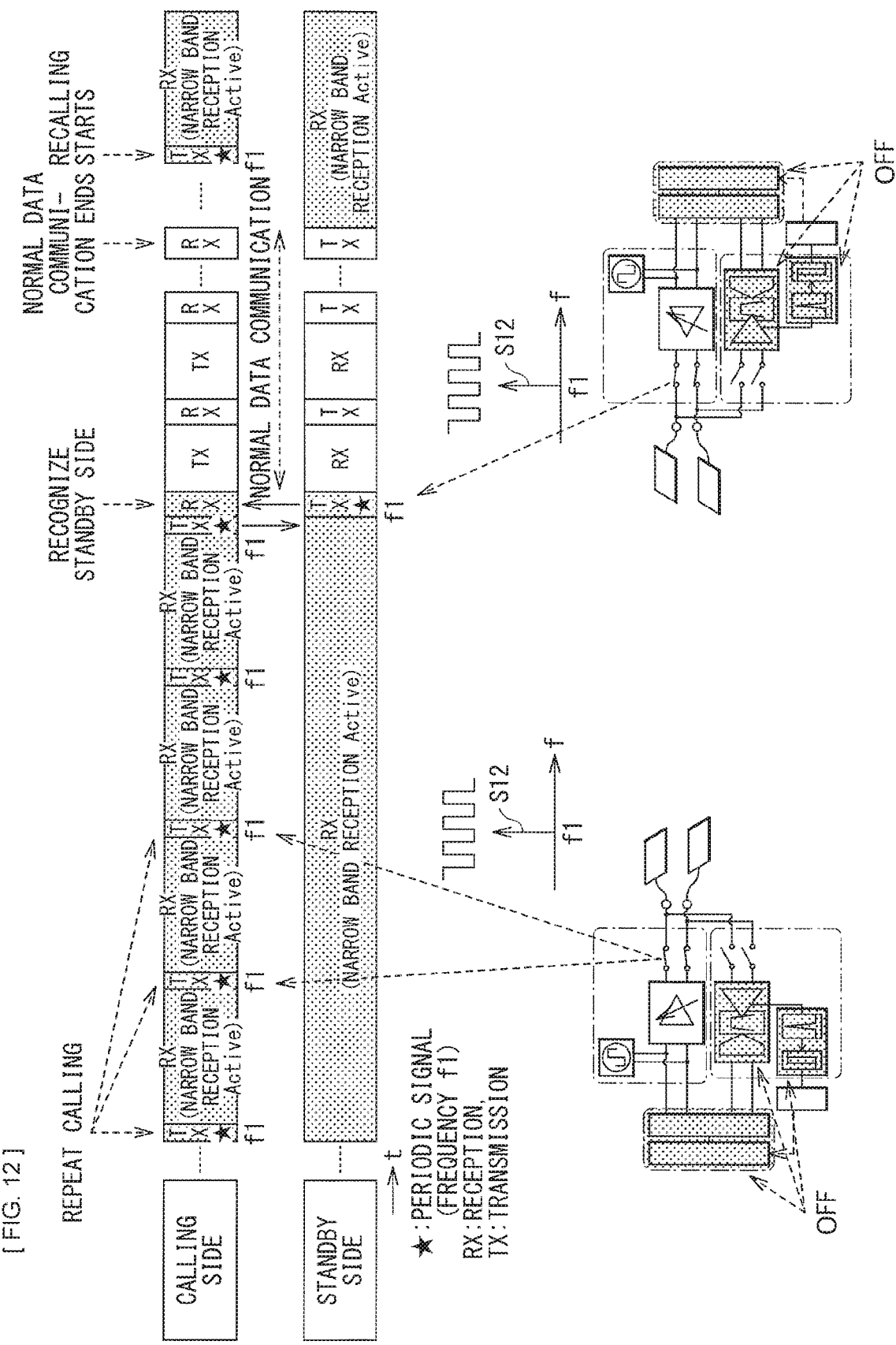

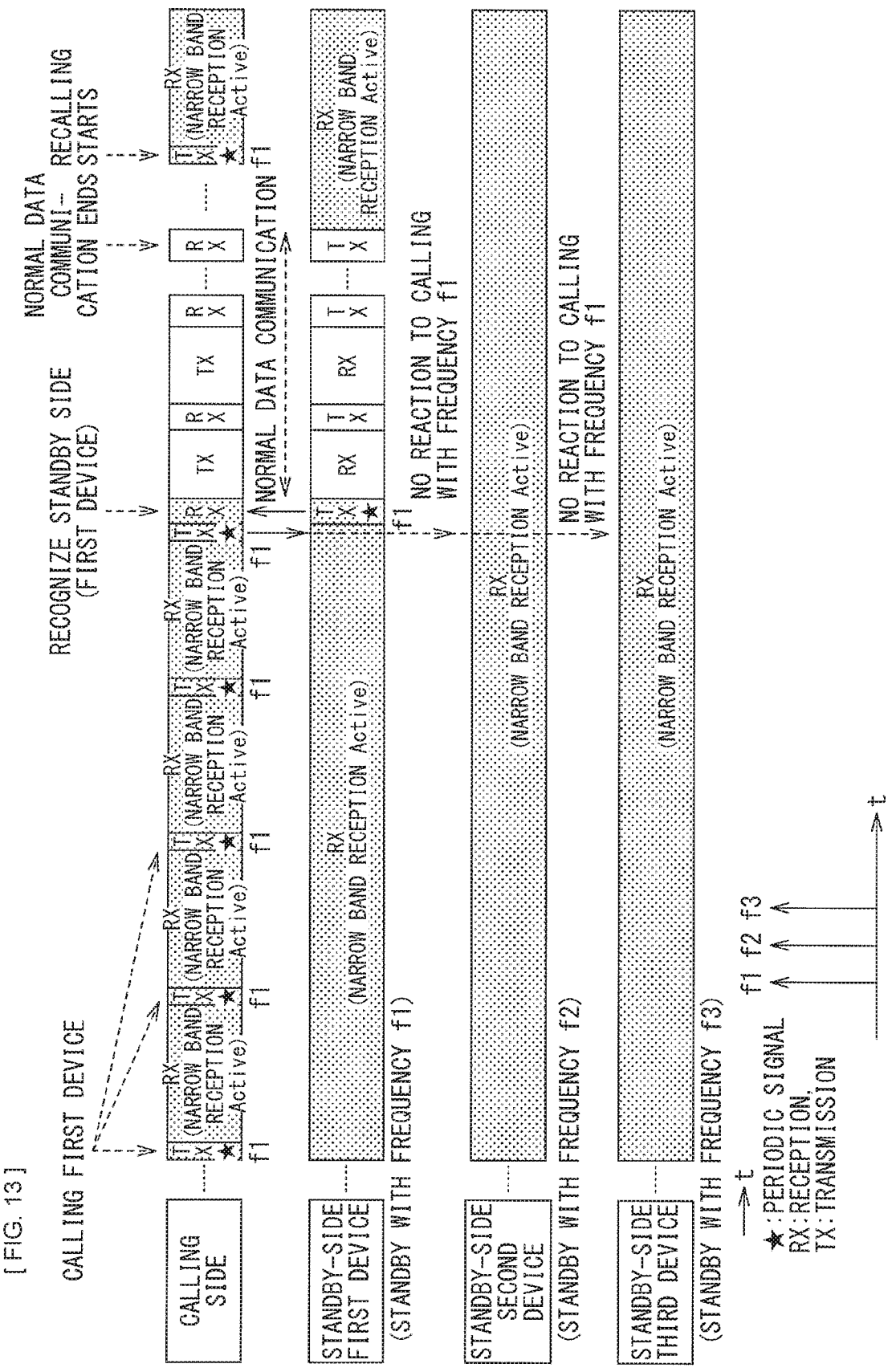

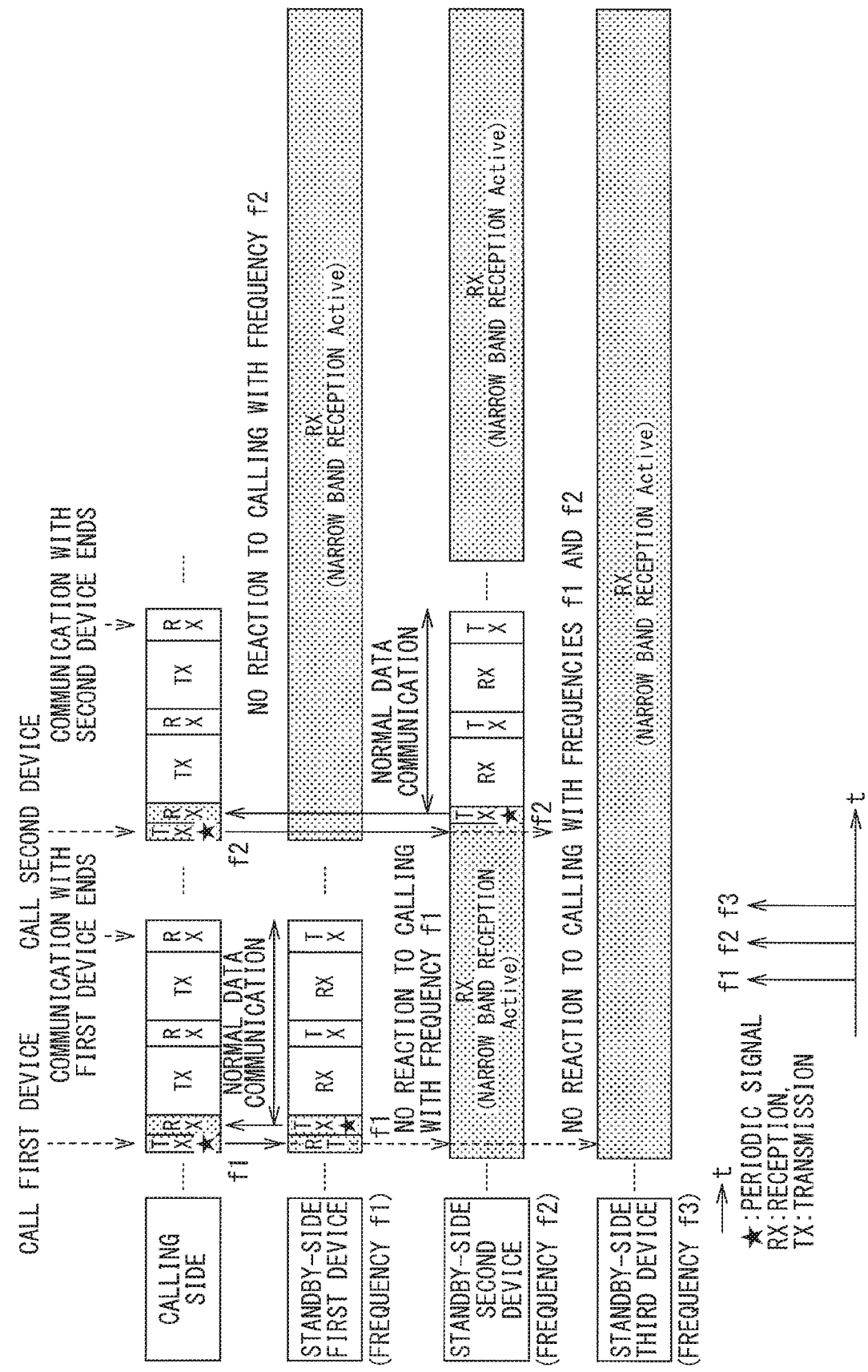

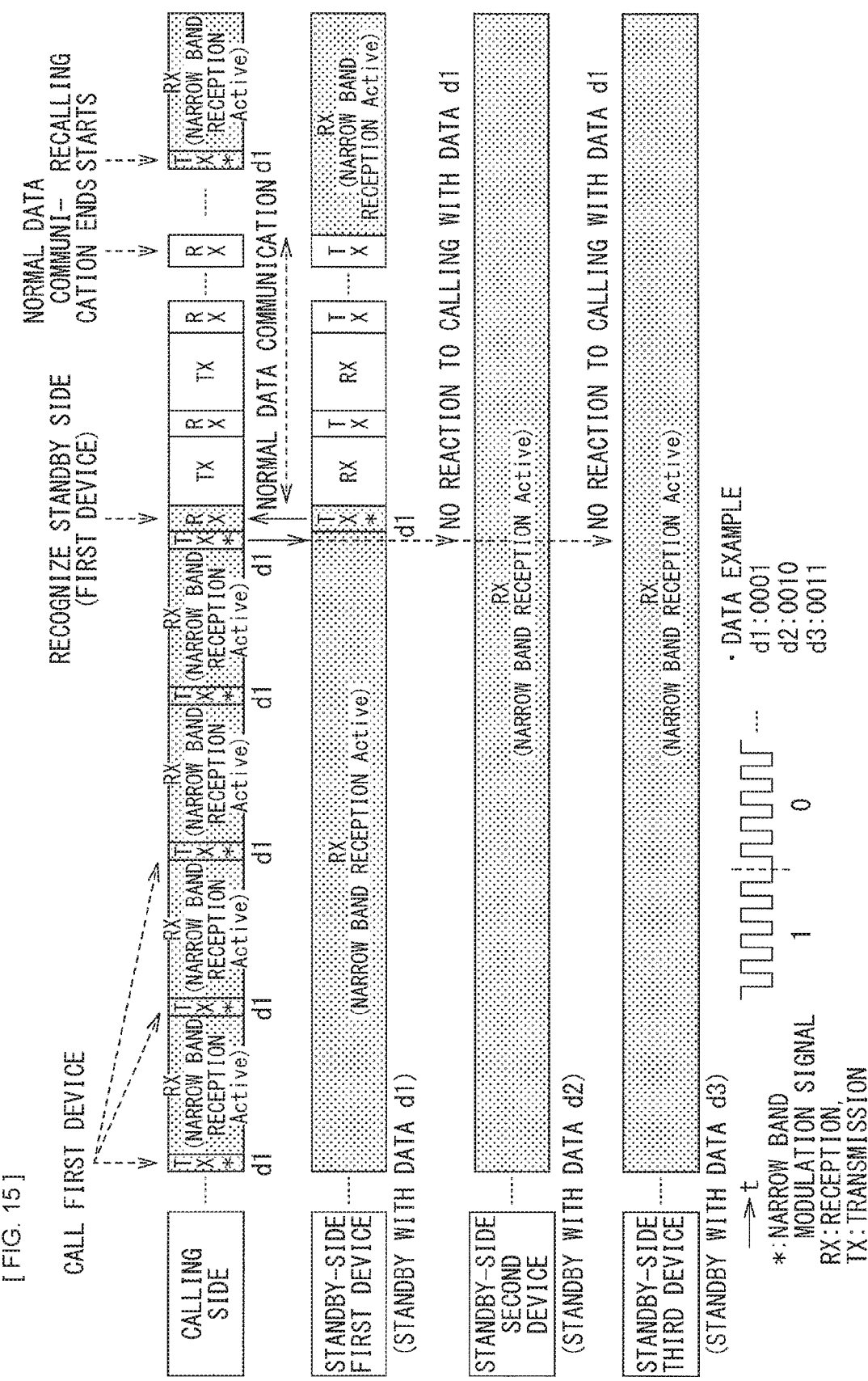

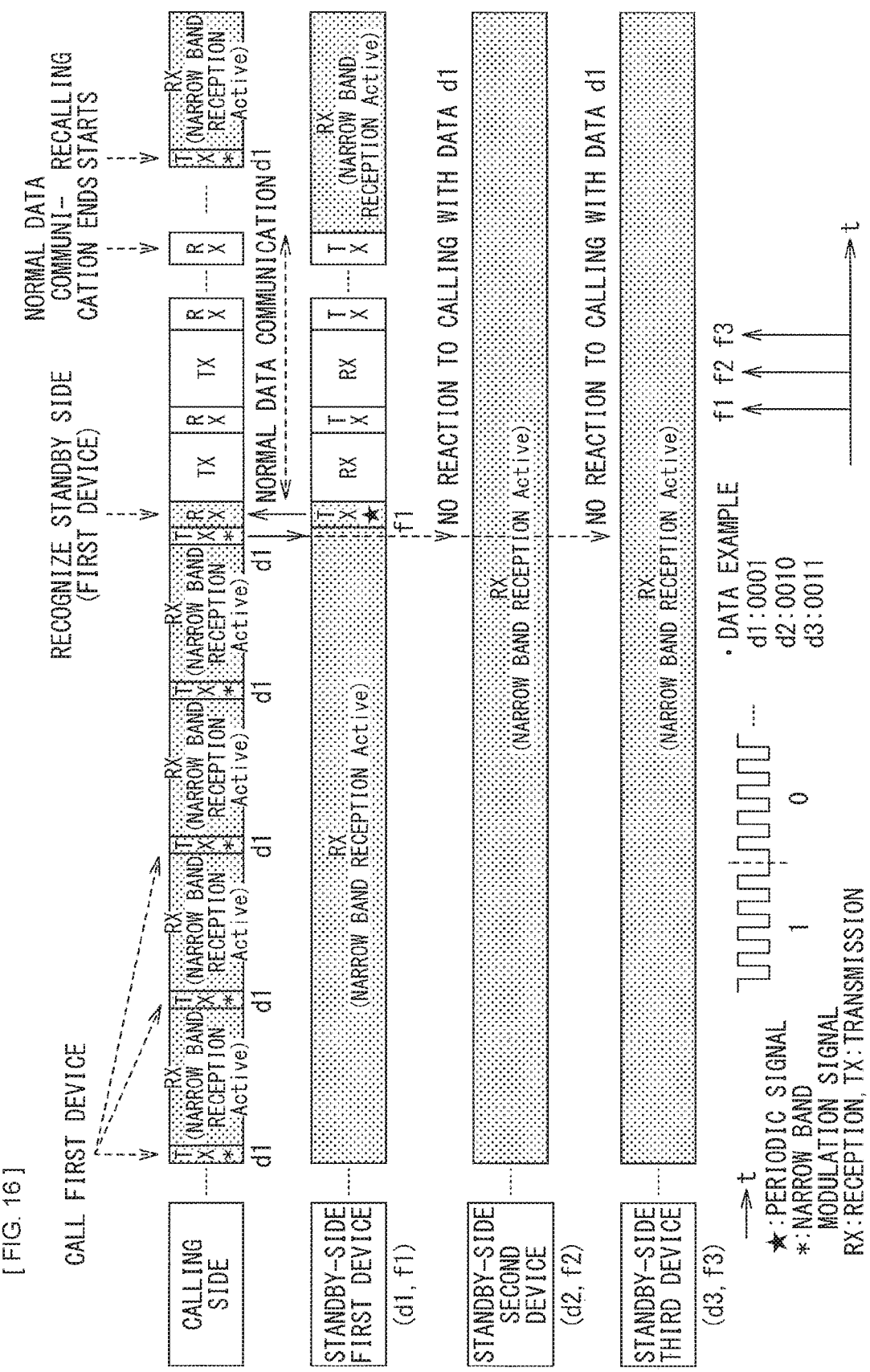
[FIG. 16]

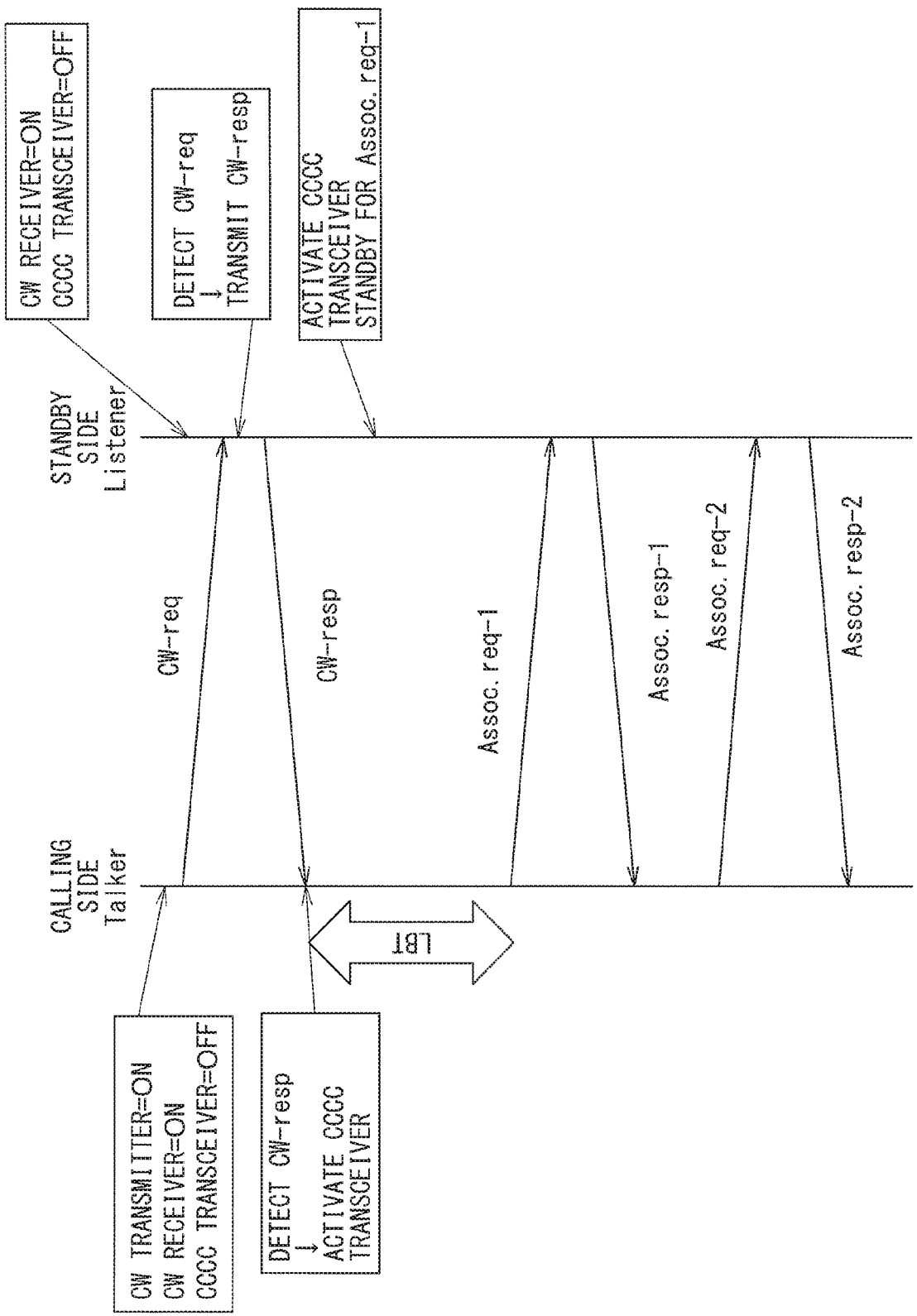

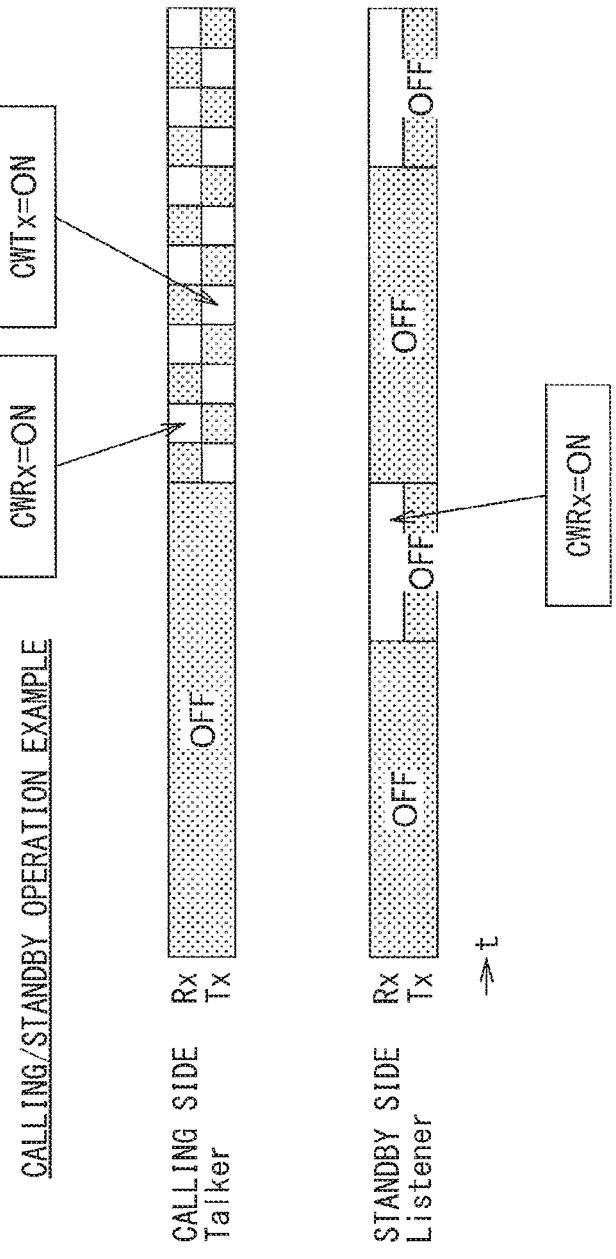

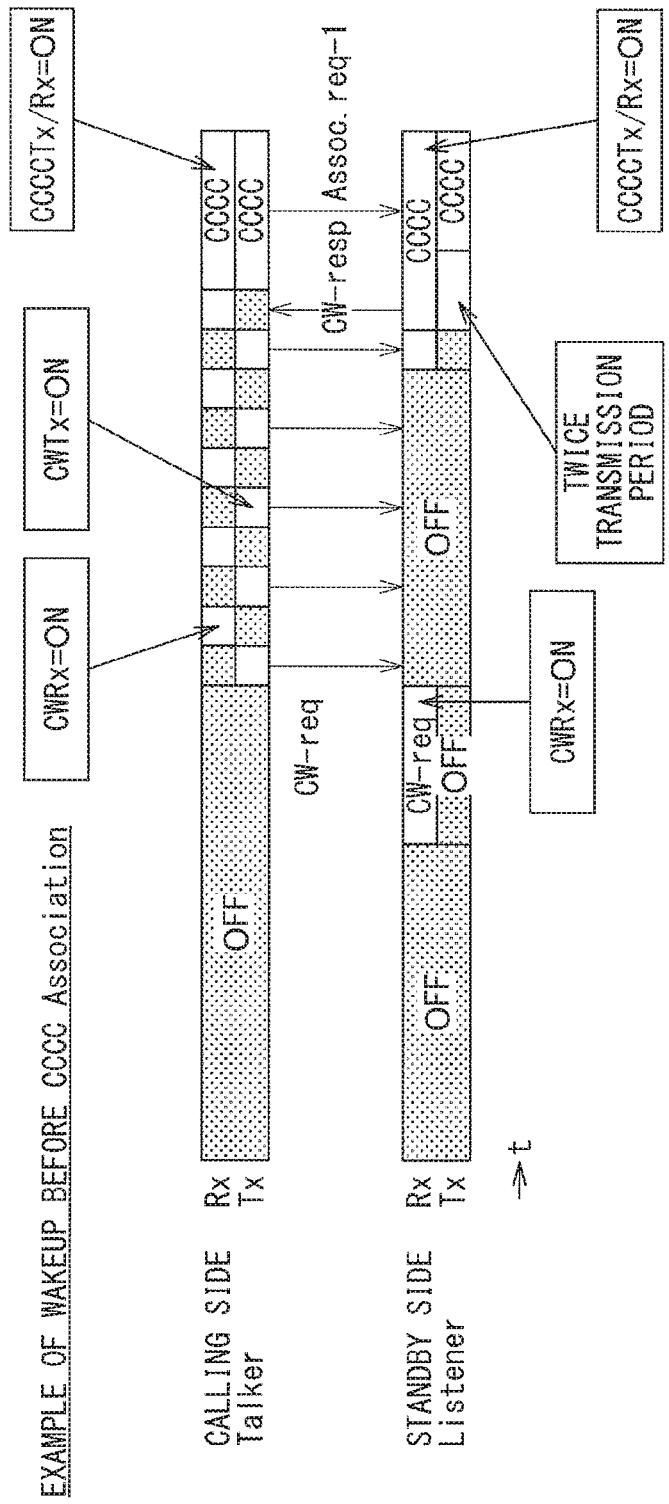

[FIG. 20]
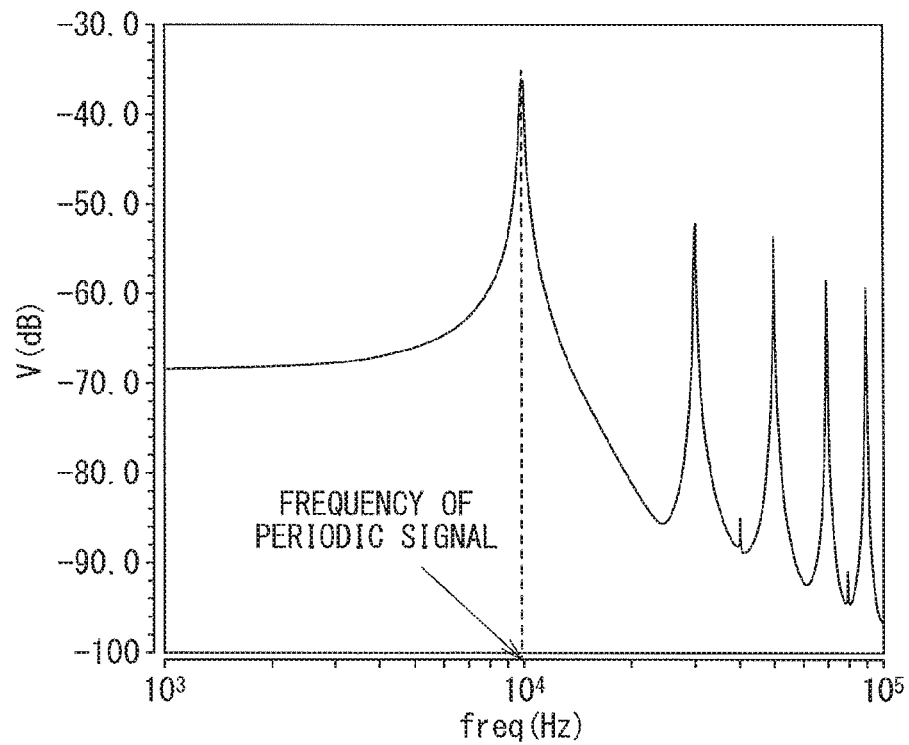

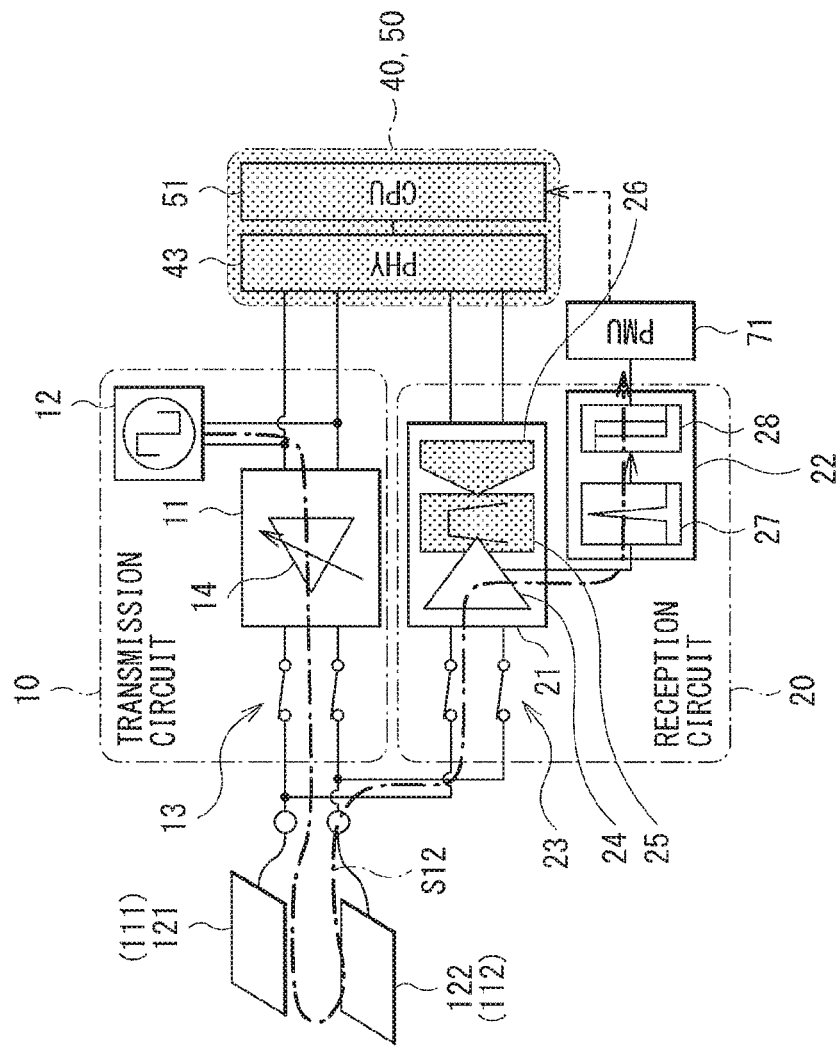
[FIG. 21]

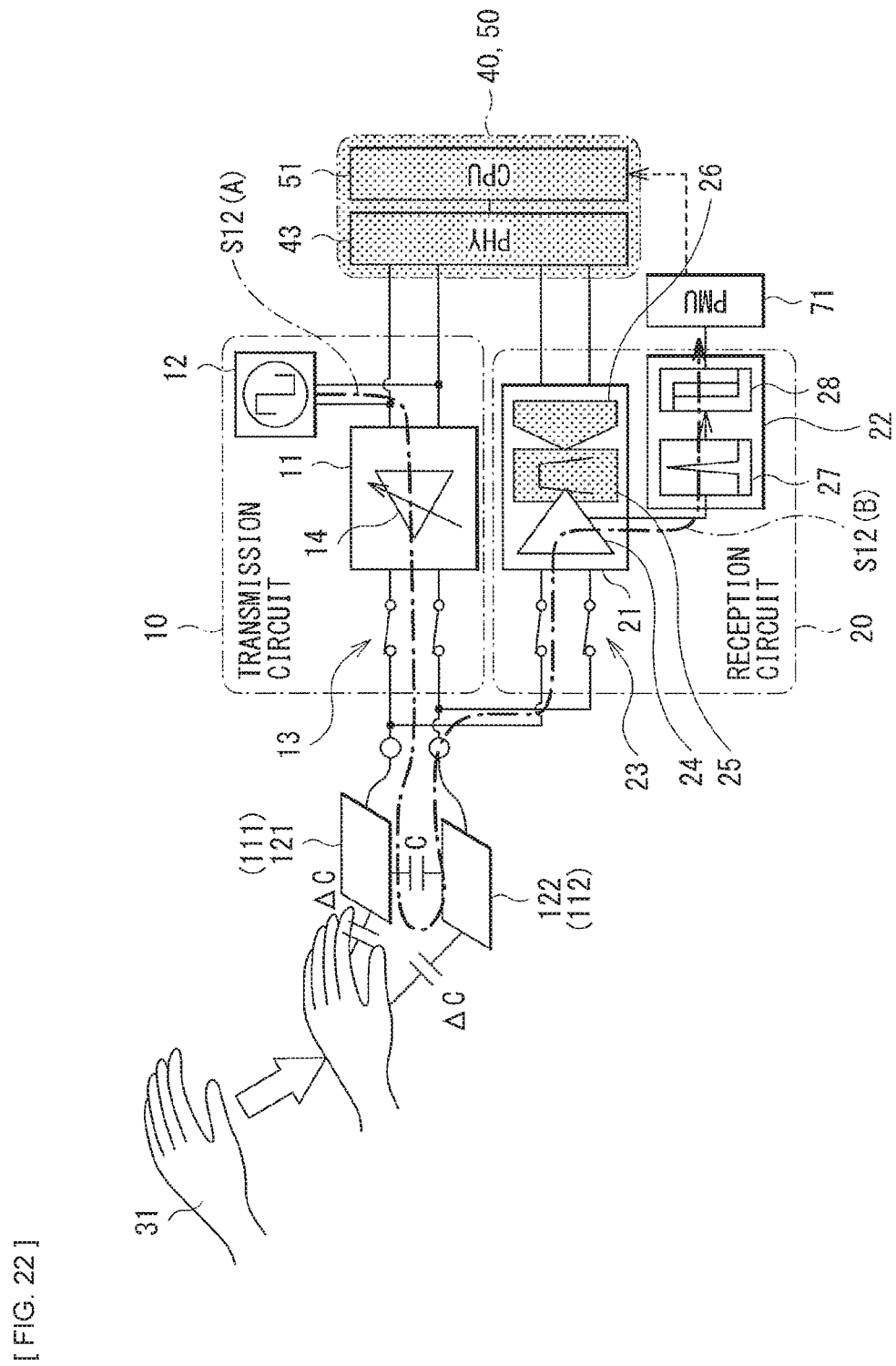
[FIG. 22]

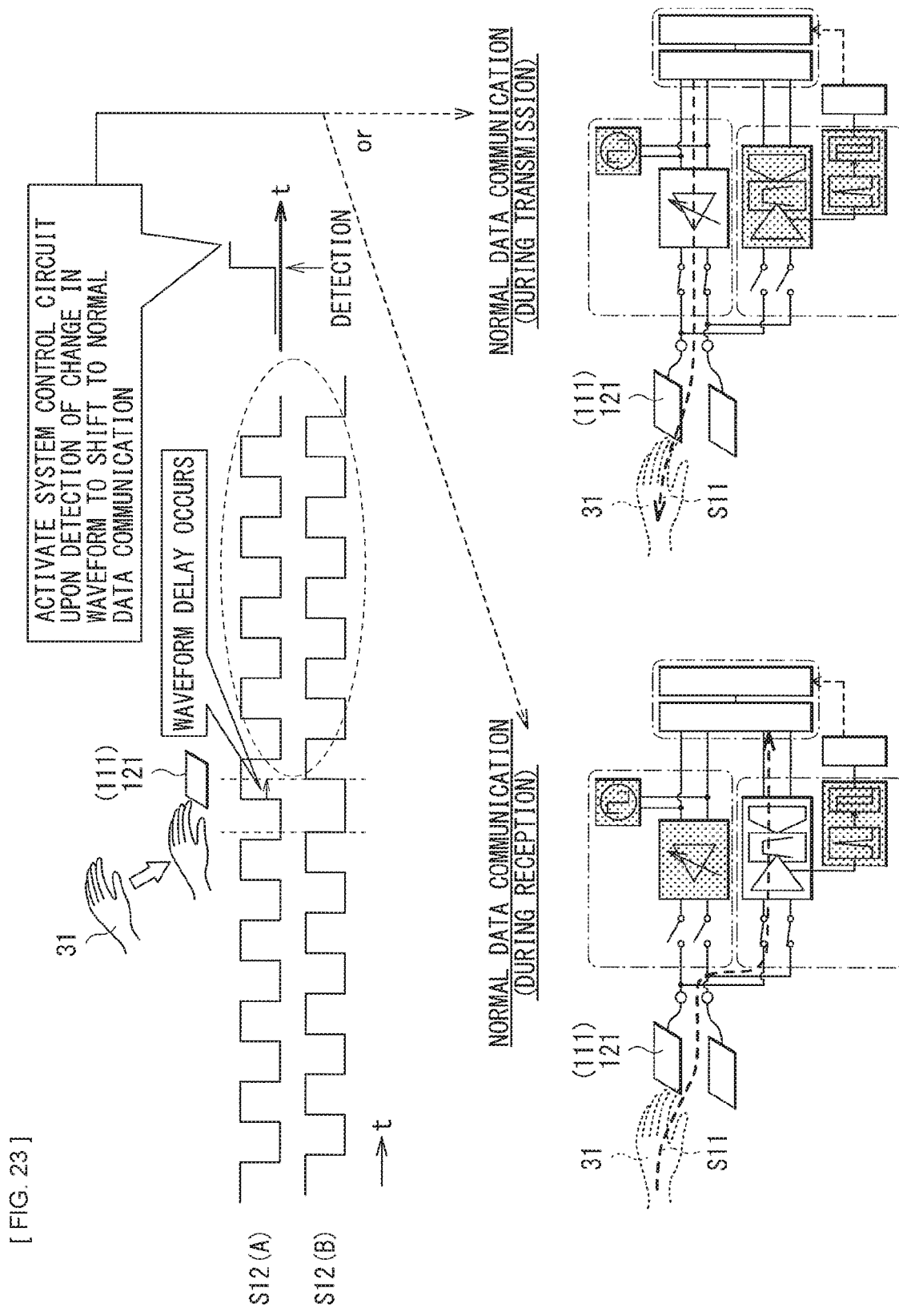
[FIG. 23]

[FIG. 24]
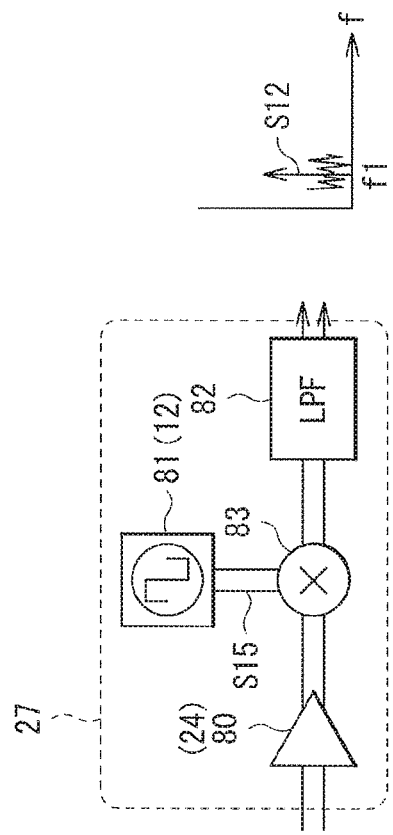
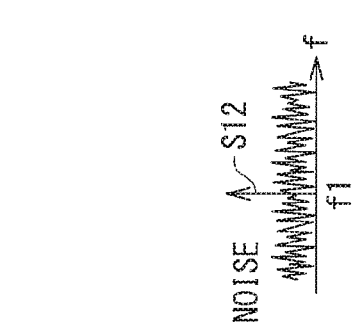

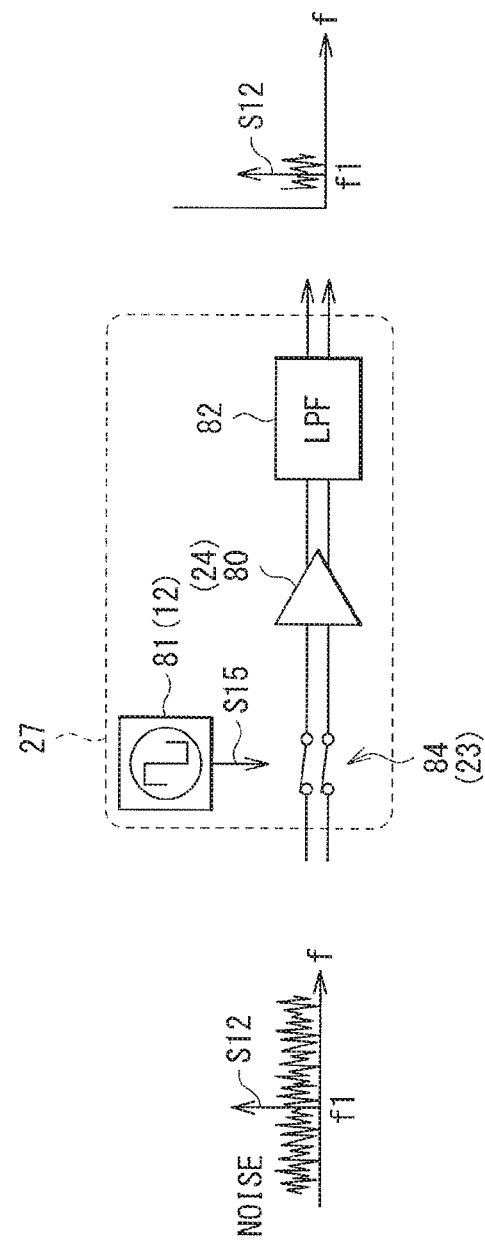
[FIG. 25]

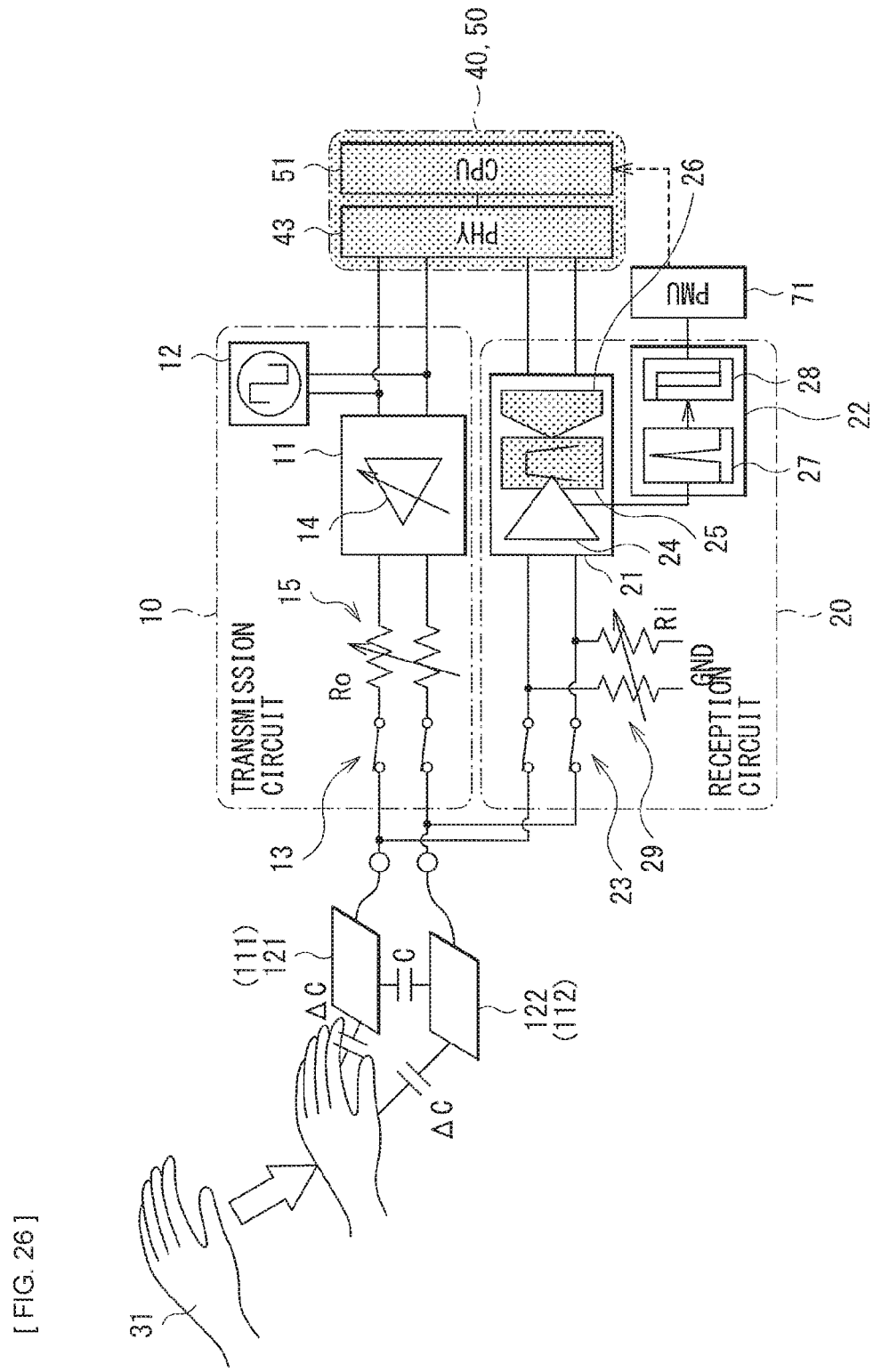
[FIG. 26]

[ FIG. 27 ]
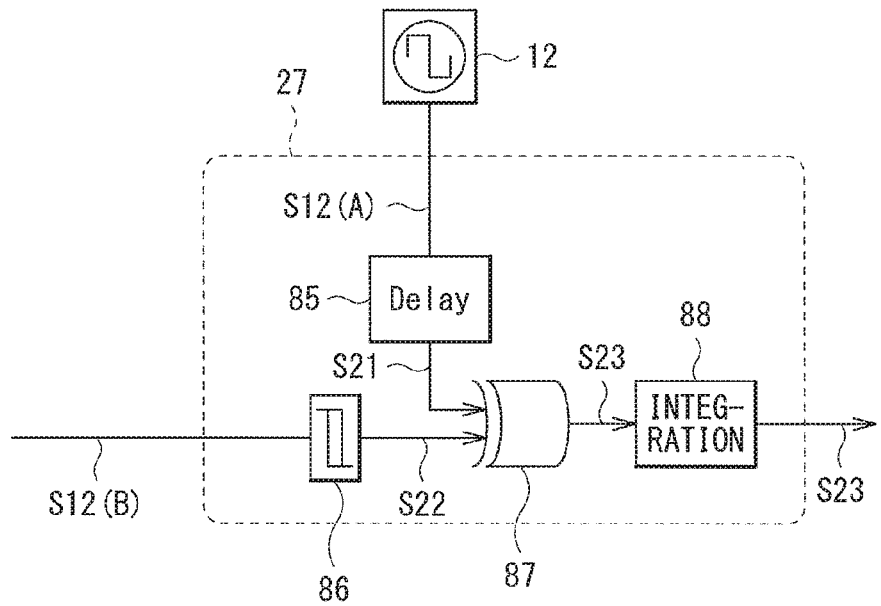
[ FIG. 28 ]
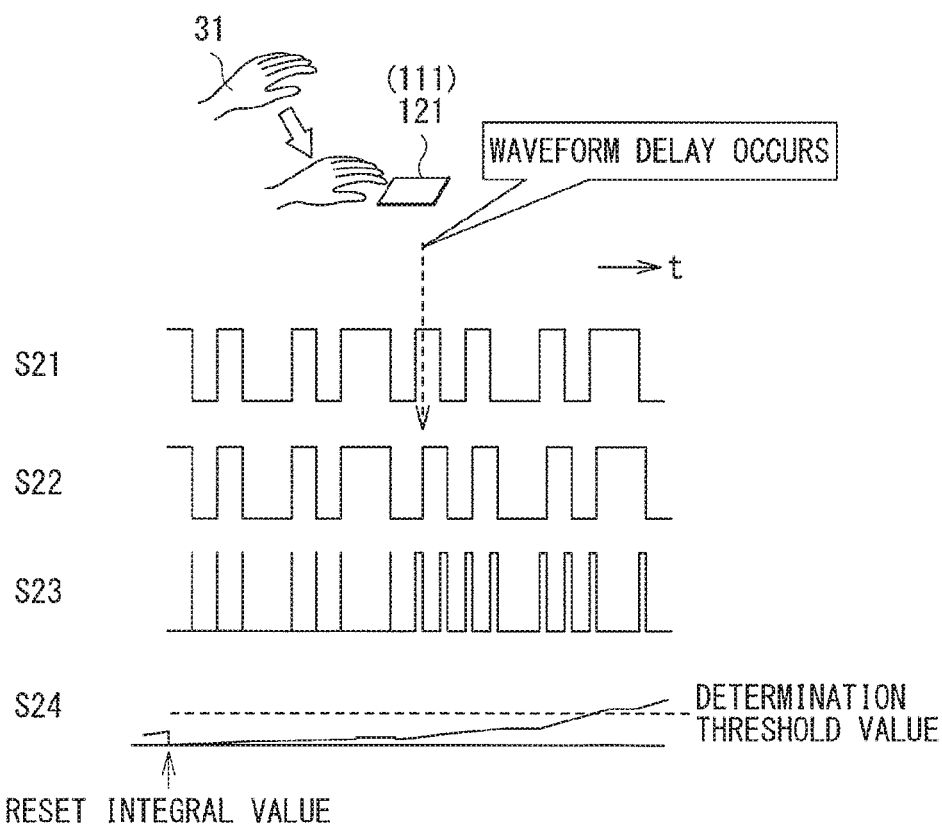

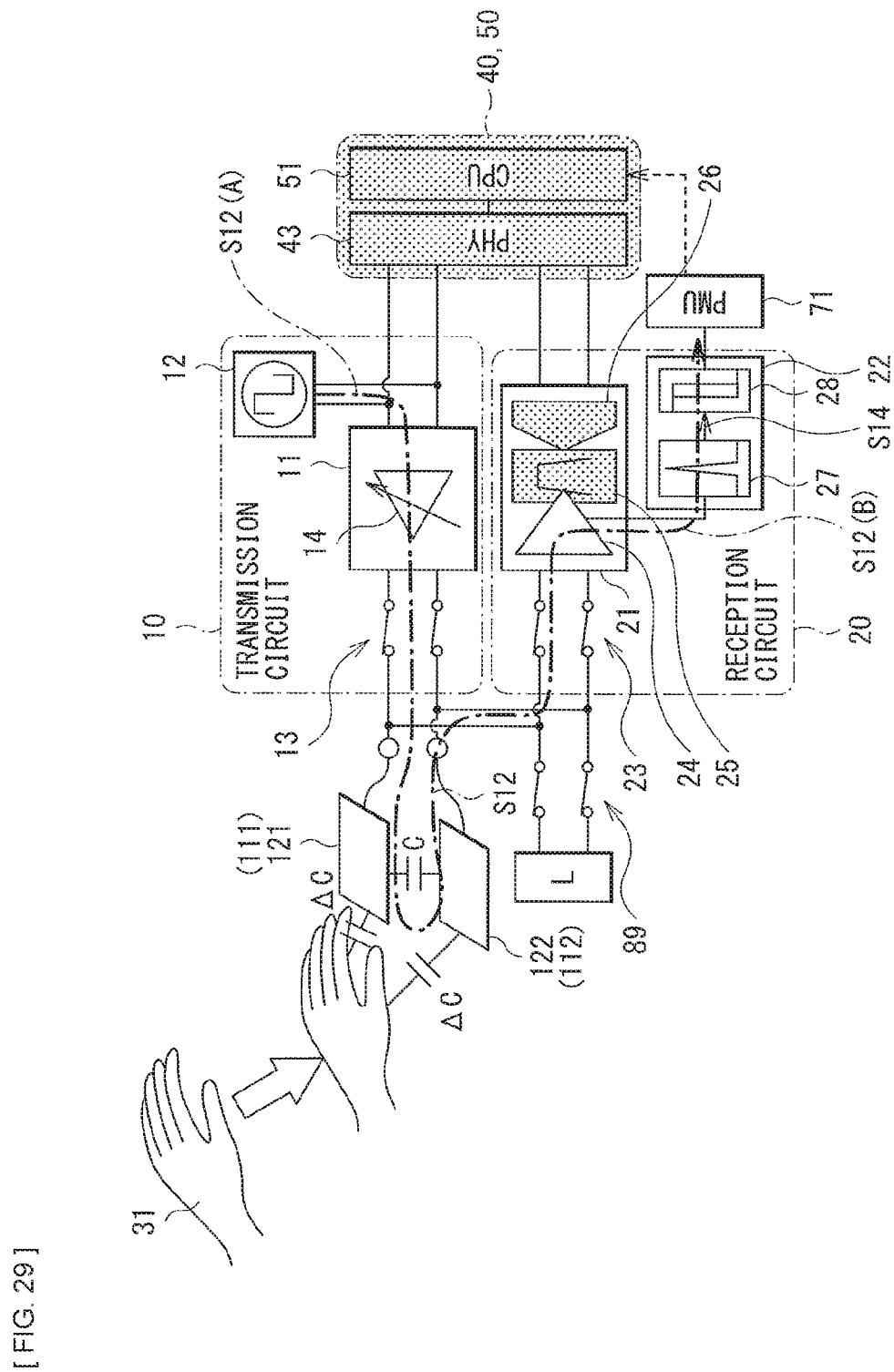
[FIG. 29]

[ FIG. 30 ]
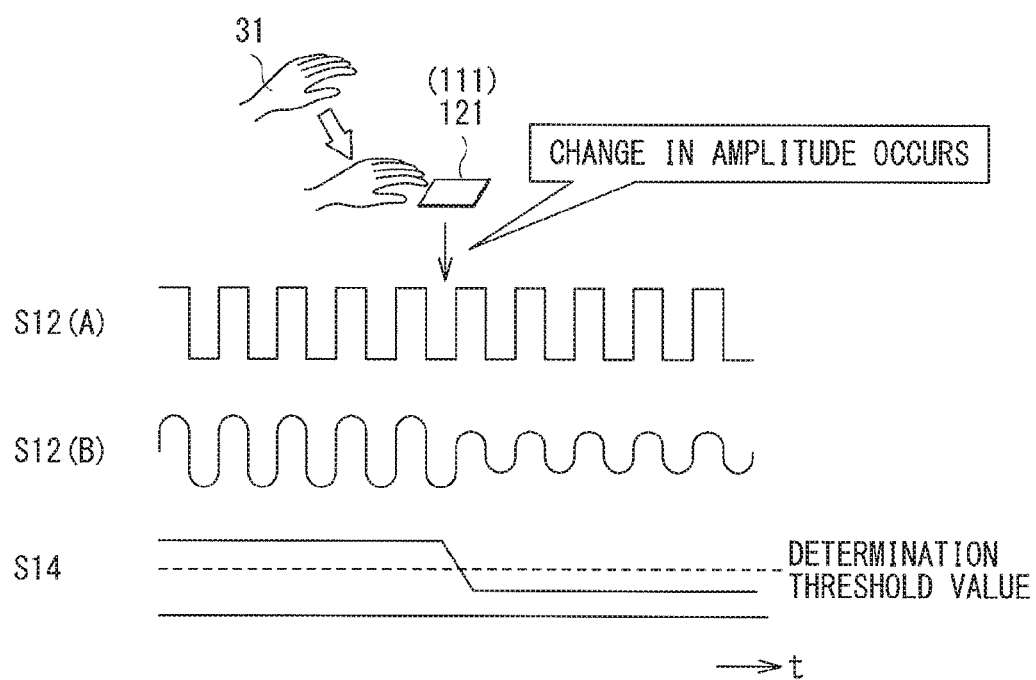

COMMUNICATION APPARATUS AND COMMUNICATION SYSTEM

CROSS REFERENCE TO RELATED APPLICATIONS

This application is a U.S. National Phase of International Patent Application No. PCT/JP2017/018339 filed on May 16, 2017, which claims priority benefit of Japanese Patent Application No. JP 2016-121716 filed in the Japan Patent Office on Jun. 20, 2016. Each of the above-referenced applications is hereby incorporated herein by reference in its entirety.

TECHNICAL FIELD

The present disclosure relates to a communication apparatus and a communication system that are suitable for electric field communication.

BACKGROUND ART

There is known a communication system using electric field communication technology that uses a human body as a communication medium.

CITATION LIST

Patent Literature

PTL 1: Japanese Unexamined Patent Application Publication No. 2006-80641

SUMMARY OF THE INVENTION

The communication system using the electric field communication technology is expected to be applied to battery-driven devices such as mobile devices and wearable devices, and is demanded to operate with low electric power consumption.

It is desirable to provide a communication apparatus and a communication system that enable reduction in electric power consumption.

A communication system according to an embodiment of the present disclosure includes one or more communication apparatuses, and each of the communication apparatuses includes: an antenna unit; a transmission circuit including a transmission unit and a signal generator, the transmission unit that selectively transmits, via the antenna unit, one of a first transmission signal including first transmission data or a second transmission signal including at least one of a periodic signal with a constant frequency or a narrow band modulation signal by data having lower speed than the first transmission data, and the signal generator that generates the second transmission signal; a reception circuit including a reception unit, a narrow band detector, and a determination unit, the reception unit that receives the first transmission signal and the second transmission signal via the antenna unit, the narrow band detector that outputs a narrow band detection signal through detecting the second transmission signal in a narrow band, and the determination unit that determines presence or absence of a significant signal or presence or absence of significant signal change in the narrow band detection signal and outputs a determination signal; and an electronic power control circuit that controls electric power of the transmission circuit and the reception circuit on the basis of the determination signal.

A communication apparatus according to an embodiment of the present disclosure includes: an antenna unit; a transmission circuit including a transmission unit and a signal generator, the transmission unit that selectively transmits, via the antenna unit, one of a first transmission signal including first transmission data or a second transmission signal including at least one of a periodic signal with a constant frequency or a narrow band modulation signal by data having lower speed than the first transmission data, and the signal generator that generates the second transmission signal; a reception circuit including a reception unit, a narrow band detector, and a determination unit, the reception unit that receives the first transmission signal and the second transmission signal via the antenna unit, the narrow band detector that outputs a narrow band detection signal through detecting the second transmission signal in a narrow band, and the determination unit that determines presence or absence of a significant signal or presence or absence of significant signal change in the narrow band detection signal and outputs a determination signal; and an electronic power control circuit that controls electric power of the transmission circuit and the reception circuit on the basis of the determination signal.

In the communication apparatus or the communication system according to the embodiment of the present disclosure, one of the first transmission signal including the first transmission data or the second transmission signal including at least one of the periodic signal with the constant frequency or the narrow band modulation signal by the data having lower speed than the first transmission data is selectively transmitted and received. Moreover, the second transmission signal including at least one of the periodic signal with the constant frequency or the narrow band modulation signal by the data having lower speed than the first transmission data is detected in the narrow band, and presence or absence of the significant signal or presence or absence of the significant signal change is determined, and then electric power of the transmission circuit and the reception circuit is controlled on the basis of the result of such determination.

According to the communication apparatus or the communication system according to the embodiment of the present disclosure, the second transmission signal including at least one of the periodic signal with the constant frequency or the narrow band modulation signal by the data having lower speed than the first transmission data is detected in the narrow band, and presence or absence of the significant signal or presence or absence of the significant signal change is determined, and then electric power of the transmission circuit and the reception circuit is controlled on the basis of the result of the determination. This makes it possible to reduce electric power consumption.

It is to be noted that effects described here are not necessarily limited and may include any of effects described in the present disclosure.

BRIEF DESCRIPTION OF THE DRAWINGS

FIG. 1 illustrates an overview of a communication system according to a comparative example using a human body as a communication medium with use of electric field communication technology.

FIG. 2 illustrates the overview of the communication system according to the comparative example using the human body as the communication medium with use of the electric field communication technology.

FIG. 3 schematically illustrates a configuration example of a communication system according to a first embodiment of the present disclosure.

FIG. 4 illustrates a configuration example of a first communication unit of a first communication apparatus (or a second communication unit of a second communication apparatus).

FIG. 5 illustrates a configuration example of the first communication unit of the first communication apparatus (or the second communication unit of the second communication apparatus).

FIG. 6 illustrates an example of normal transmission data, a periodic signal, and a narrow band modulation signal.

FIG. 7 illustrates an example of the normal transmission data, the periodic signal, and the narrow band modulation signal.

FIG. 8 illustrates an example of the periodic signal, a narrow band detection signal, and a determination signal.

FIG. 9 illustrates an overview of an operation of the communication system according to the first embodiment.

FIG. 10 illustrates a first operation example of the communication system.

FIG. 11 illustrates a second operation example of the communication system.

FIG. 12 illustrates a third operation example of the communication system.

FIG. 13 illustrates a fourth operation example of the communication system.

FIG. 14 illustrates a fifth operation example of the communication system.

FIG. 15 illustrates a sixth operation example of the communication system.

FIG. 16 illustrates a seventh operation example of the communication system.

FIG. 17 illustrates an eighth operation example of the communication system.

FIG. 18 illustrates the eighth operation example of the communication system.

FIG. 19 illustrates the eighth operation example of the communication system.

FIG. 20 illustrates a characteristic example of an analog discrete-time bandpass filter.

FIG. 21 schematically illustrates an example of a circuit configuration during loopback in a communication system according to a second embodiment of the present disclosure.

FIG. 22 illustrates an example of a capacity generated in an antenna unit during loopback.

FIG. 23 illustrates an example of change in waveform of a transmission signal caused during loopback.

FIG. 24 illustrates a first configuration example of a narrow band filter in the second embodiment.

FIG. 25 illustrates a second configuration example of the narrow band filter in the second embodiment.

FIG. 26 illustrates a circuit configuration example according to a first modification example of the second embodiment.

FIG. 27 illustrates a second modification example of the second embodiment.

FIG. 28 illustrates an example of change in waveforms of output signals of respective components of the narrow band filter.

FIG. 29 illustrates a circuit configuration example according to a third modification example of the second embodiment.

FIG. 30 illustrates an example of change in waveform of a transmission signal caused during loopback.

MODES FOR CARRYING OUT THE INVENTION

In the following, some embodiments of the present disclosure are described in detail with reference to the drawings. It is to be noted that description is given in the following order.

0. Comparative Example (an overview of a communication system using a human body as a communication medium) (FIGS. 1 and 2)
1. First Embodiment (a communication system including a communication apparatus that enables a calling operation and a standby operation)
　1.1 Configuration of Communication System according to First Embodiment (FIGS. 3 to 8)
　1.2 Operation of Communication System according to First Embodiment (FIGS. 9 to 19)
　1.3 Characteristics of Narrow Band Filter (FIG. 20)
　1.4 Effects
2. Second Embodiment (a communication system including a communication apparatus that enables a loopback operation)
　2.1 Configuration of Communication System according to Second Embodiment (FIG. 21)
　2.2 Operation of Communication System according to Second Embodiment (FIGS. 22 and 23)
　2.3 Specific Example of Narrow Band Filter in Communication System according to Second Embodiment (FIGS. 24 and 25)
　2.4 Modification Examples of Communication System according to Second Embodiment (FIGS. 26 to 30)
3. Other Embodiments

0. Comparative Example

FIGS. 1 and 2 illustrates an overview of a communication system according to a comparative example using a human body as a communication medium with use of electric field communication technology.

The communication system includes a transmitter 210 and a receiver 220.

The transmitter 210 includes a transmission unit 211, a first human body electrode 111, and a first spatial electrode 112. The transmission unit 211 includes an electric field communication mode communication circuit.

The receiver 220 includes a reception unit 221, a second human body electrode 121, and a second spatial electrode 122. The reception unit 221 includes an electric field communication mode communication circuit.

In a case where a signal is transmitted from the transmitter 210, the transmission unit 211 generates a potential-difference transmission signal including a signal modulated by a predetermined modulation mode between the first human body electrode 111 and the first spatial electrode 112. The first human body electrode 111 is disposed closer to a human body 30 than the first spatial electrode 112. Hence, the first human body electrode 111 is disposed to have stronger electrostatic coupling with a communication medium (human body) 30 than the first spatial electrode 112.

In the communication system, a human body-side communication path using the human body 30 as the communication medium 30 is formed between the first human body electrode 111 and the second human body electrode 121 by approach of a portion of the human body 30 closer to the second human body electrode 121 than to the second spatial electrode 122. Moreover, a space-side communication path using space (for example, air) as a communication medium is formed between the first spatial electrode 112 and the second spatial electrode 122.

A potential difference corresponding to a transmission signal to be transmitted via the communication medium (human body) 30 is generated between the second human body electrode 121 and the second spatial electrode 122. The reception unit 221 detects the potential difference generated between the second human body electrode 121 and the second spatial electrode 122, performs a demodulation process corresponding to the modulation mode of the first communication unit 113 to generate a reception signal, and outputs the reception signal as an output signal.

As application examples of such a communication system, for example, as illustrated in FIG. 2, it is expected that the transmitter 210 is provided in a smart watch 93 or a wristband and the receiver 220 is provided in a doorknob 91 of a door 90, a smartphone 92, etc.

As described above, in the electric field communication, an electric field E is distributed onto a surface of the human body by contact with or approach to the human body electrode to perform communication. Hence, communication is possible only in close proximity to the human body 30. The electric field communication has high compatibility with a wearable device. A communication region by the electric field communication is narrower than communication regions of Bluetooth (registered trademark), etc., and communication is possible only in close proximity to the human body 30.

Applications using NFC (Near Field Communication) increase with each passing year; however, it is necessary to take out an NFC built-in device such as a smartphone and a commuter pass and bring the NFC built-in device closely. While NFC is proximity communication by a magnetic field, there is proximity communication by the electric field E. So-called intra-body communication using the human body 30 as a communication path is proximity communication using the electric field E, and makes it possible to achieve a similar I/F (interface) with use of a palm and a shoe without taking out the device because of a property that the electric field E spreads over the human body 30, and in a case where extension to an instinct UI (user interface) is desired, there is a possibility that the electric field communication becomes more convenient. In future, it is expected that a function of the electric field communication is provided as a novel added value to a mobile device and a wearable device, and an automobile, a bicycle, an electric home appliance, a commercial device, and the like as partners of the mobile device and the wearable device.

The mobile device and the wearable device each generally operate with a battery. Accordingly, in the mobile device and the wearable device, battery duration is an important factor for usability, and a low electric power consumption operation is demanded in all functions. The battery duration is specifically important in products using only a small-capacity battery such as a wristband and a watch. However, in a case where the electric field communication is provided, for example, communication is not continuously performed between the smartphone 92 and the wristband and between both the smartphone 92 and the wristband and another product; however, if a user wants to perform communication, it is necessary to promptly establish connection therebetween. Accordingly, it is necessary to reduce electric power necessary for the calling and standby operations.

In order to reduce electric power necessary for the calling and standby operations, in a use case where it is only necessary to perform communication upon contact of a human, in the electric field communication, there are examples in which an increase in capacity upon contact of the human with an electric field communication antenna unit (an electrode) is detected and used as a trigger of communication start (Japanese Unexamined Patent Application Publication No. 2013-157789, Japanese Unexamined Patent Application Publication No. 2009-200637, Japanese Unexamined Patent Application Publication No. 2011-182279, Japanese Unexamined Patent Application Publication No. 2009-253478, and Japanese Unexamined Patent Application Publication No. 2006-80641). However, these examples lack concreteness as a detection method. A change amount of capacity of the electrode is not so large, and the electric field communication receives environmental noise generated by a commercial power source and various apparatuses without exception. An amplitude of the noise easily exceeds, for example, 100 mV in some cases, and there are many variations in noise waveform and frequency; therefore, detection is not possible without consideration of influences thereof.

Moreover, in a use case of the wristband or the watch, the electrode is continuously in contact with the human body 30; therefore, it is not possible to detect a change in capacity caused by contact of the human body 30 and use the change as a communication trigger. In a case where it is not possible to use contact of the human body 30 as a trigger, there is considered a method in which in a case where a standby side detects a signal transmitted from a calling side, the standby side starts a system operation. Herein, the international standard ISO/IEC17982 for capacitive proximity communication specifies a Manchester-coded baseband signal. Moreover, a signal specified by IEEE802.15.6 HBC as a standard of IEEE (Institute of Electrical and Electronics Engineers) uses a carrier, but is a MHz-order wide band signal. Therefore, for example, in a case where an amount of attenuation of a path such as a path from the smartphone 92 in a left hand to a wristband signal on a right wrist is large, stable detection is not possible by an influence of environmental noise in addition to thermal noise.

There is an example in which a non-modulated signal for connection is transmitted before transmission of a data signal, and the standby side activates a circuit that receives the data signal after reception of the non-modulated signal (Japanese Unexamined Patent Application Publication No. 2006-80641). This example makes it possible to reduce electric power during standby; however, the calling side does not know that the standby side is activated. Accordingly, it is necessary to continuously operate a transmission-reception function of normal data communication. Moreover, in this example, it is not possible to reduce electric power during standby through using contact of the human body 30 as a trigger.

In order to largely reduce electric power for calling and standby in the electric field communication, it is preferable to have both a function of detecting change in capacity of the antenna unit (the electrode) caused by contact of the human body 30 and using the contact as a trigger and a function of causing a standby side communication apparatus to detect a calling-side signal and inform such detection to a calling-side communication apparatus and causing calling-side communication apparatus to detect a signal from the standby-side communication apparatus, and to enable a common circuit to perform these functions.

The present disclosure provides technology that enables a common circuit to perform both the functions.

1. First Embodiment

1.1 Configuration of Communication System According to First Embodiment

FIG. 3 schematically illustrates a configuration example of a communication system according to a first embodiment of the present disclosure.

It is to be noted that in the following, components substantially same as those of the communication system according to the comparative example in FIGS. 1 and 2 are denoted by same reference numerals, and description thereof is omitted as appropriate.

The communication system 100 according to the present embodiment is a system that performs communication via the human body 30 by an electric field mode. The communication system 100 includes a first communication apparatus 110 and a second communication apparatus 120.

The first communication apparatus 110 is provided in, for example, the doorknob 91 of the door 90, the smartphone 92, etc., and may be applied to a calling-side device (a calling device) to be described later. The second communication apparatus 120 is provided in, for example, the smart watch 93, a wristband, etc., and may be applied to a standby-side device (a standby device) to be described later. Moreover, conversely, the first communication apparatus 110 may be a standby device provided in, for example, the smart watch 93, the wristband, etc., and the second communication apparatus 120 may be the calling device provided in the doorknob 91, the smartphone 92, etc.

The first communication apparatus 110 includes a first antenna unit 115 and a first communication unit 113. The first antenna unit 115 includes the first human body electrode 111 and the first spatial electrode 112. The first communication unit 113 is coupled to a host 114.

The second communication apparatus 120 includes a second antenna unit 125 and a second communication unit 123. The second antenna unit 125 includes the second human body electrode 121 and the second spatial electrode 122. The second communication unit 123 is coupled to a host 124.

The first communication unit 113 of the first communication apparatus 110 and the second communication unit 123 of the second communication apparatus 120 may have a substantially similar configuration.

FIGS. 4 and 5 each illustrate a configuration example of the first communication unit 113 of the first communication apparatus 110 (or the second communication unit 123 of the second communication apparatus 120).

It is to be noted that FIG. 5 illustrates a circuit state in a case where normal transmission data S11 is transmitted. In FIG. 5, a gray (hatched) circuit portion indicates that supply of electric power stops and an operation is off. This also applies to other following circuit diagrams.

The first communication unit 113 (or the second communication unit 123) includes a transmission circuit 10, a reception circuit 20, an oscillation circuit 60, a modulator-demodulator 40, and a system control circuit 50.

The transmission circuit 10 and the reception circuit 20 each may basically include an analog circuit.

The transmission circuit 10 includes a transmission unit 11, a periodic signal-narrow band signal generator 12, and an analog switch 13. The transmission unit 11 includes an amplifier 14.

The reception circuit 20 includes a reception unit 21, a narrow band detection-determination unit 22, and an analog switch 23. The reception unit 21 includes an amplifier 24, a bandpass filter 25, and an AD converter 26. The narrow band detection-determination unit 22 includes a narrow band filter 27 and a determination circuit 28.

A power source circuit 70 includes a PMU (Power Management Unit) (electric power control circuit) 71.

The modulator-demodulator 40 includes a modulation circuit 41 and demodulation circuit 42. The modulation circuit 41 has a function of generating a modulation signal by the transmission data S11. Moreover, the modulator-demodulator 40 includes a PHY (physical layer) 43.

The oscillation circuit 60 is coupled to a quartz-crystal resonator (Xtal) 61.

The transmission circuit 10 has a function of generating a signal generated by the modulation circuit 41, and a periodic signal S12 with a constant frequency or a narrow band modulation signal S13 by data having lower speed than the normal transmission data S11, and applying the signals in a predetermined frequency band to the antenna unit 125 (115) (the human body electrode 121 (111) and the spatial electrode 122 (112)).

The reception circuit 20 has a function of causing the reception unit 21 to generate a signal that is demodulable by the demodulation circuit 42 from a signal induced in the antenna unit 125 (115). Moreover, the reception circuit 20 has a function of causing the narrow band filter 27 to detect the periodic signal S12 or the narrow band modulation signal S13 in a narrow band and a function of causing the determination circuit 28 to determine presence or absence of a significant signal or presence or absence of significant signal change in the narrow band detection signal S14.

The demodulation circuit 42 has a function of demodulating the transmission data S11 from the signal generated by the reception circuit 20.

The system control circuit 50 has a function of controlling operations of the transmission circuit 10, the reception circuit 20, the oscillation circuit 60, the modulation circuit 41, and the demodulation circuit 42 by a control signal 51. Moreover, the system control circuit 50 has a function of performing processing on communication with a device (the host 124 (114)) outside the system and control from the device (the host 124 (114)) outside the system. The system control circuit 50 includes a CPU (Central Processing Unit) 51.

In the communication apparatus 120 (110), even if the system control circuit 50 is in a standby state (an off state), functions for the periodic signal S12 or the narrow band modulation signal S13 are operable in the transmission circuit 10, the reception circuit 20, and the oscillation circuit 60 during transmission and reception of the periodic signal S12 or the narrow band modulation signal S13.

Moreover, the communication apparatus 120 (110) has a function of activating the system control circuit 50 by determination of presence or absence of the significant signal or presence or absence of the significant signal change by the reception circuit 20. Further, the communication apparatus 120 (110) has a function of activating functions corresponding to transmission and reception of the normal transmission data S11 in the transmission circuit 10, the reception circuit 20, the oscillation circuit 60, the modulation circuit 41, and the demodulation circuit 42.

FIGS. 6 and 7 illustrate an example of the normal transmission data (the first transmission signal) S11, the periodic signal (the second transmission signal) S12, and the narrow band modulation signal (the second transmission signal) S13. The normal transmission data S11 is, for example, a Manchester-coded signal.

FIG. 8 illustrates an example of the periodic signal S12 (or the narrow band modulation signal S13), the narrow band detection signal S14, and the determination signal S2.

The periodic signal-narrow band signal generator 12, the narrow band detection-determination unit 22, and the oscillation circuit 60 are operable even if the system control circuit 50 is in the standby state (the off state). During standby, the oscillation circuit 60 stops other unnecessary clocks of the modulation circuit 41 and the demodulation circuit 42.

The PMU 71 continuously operates at low electric power. The determination signal S2 is inputted to the PMU 71. The PMU 71 may activate the system control circuit 50 on the basis of the determination signal S2. The PMU 71 activates the system control circuit 50 in the standby state in a case where the narrow band detection-determination unit 22 detects the significant signal or in a case where the narrow band detection-determination unit 22 detects the significant signal change.

The periodic signal-narrow band signal generator 12 and the narrow band detection-determination unit 22 operate at low electric power.

Other configurations may be substantially similar to those in the communication system according to the foregoing comparative example.

1.2 Operation of Communication System According to First Embodiment (Overview of Operation of Communication System)

The calling-side device (the calling device) may include the first communication apparatus 110 in the following operation examples. The standby-side device (the standby device) may include the second communication apparatus 120.

The calling device has a function of transmitting the periodic signal S12 or the narrow band modulation signal S13 in a fixed time period. The calling device has a function of receiving the periodic signal S12 or the narrow band modulation signal S13 in a fixed time period after the transmission operation in the fixed time period. The calling device continuously or intermittently repeats the transmission operation in the fixed time period and the reception operation in the fixed time period.

The standby device continuously or intermittently repeats reception of the periodic signal S12 or the narrow band modulation signal S13 in a fixed time period. In a case where the standby device determines that the significant signal from the calling device is present or the significant signal change is present, the standby device transmits the periodic signal S12 or the narrow band modulation signal S13 to the calling device, and thereafter activates the system control circuit 50 to shift to a reception state of the normal transmission data S11.

In a case where the calling device determines that the significant signal from the standby device is present or the significant signal change is present upon reception, the calling device shifts to transmission of the normal transmission data S11. Thus, normal data communication starts between the calling device and the standby device.

FIG. 9 illustrates a circuit state in a case where the calling device transmits the periodic signal S12 or the narrow band modulation signal S13 and the standby device receives the periodic signal S12 or the narrow band modulation signal S13.

In FIG. 9, gray blocks are off and other blocks are on in an active period during standby reception. Blocks to be turned on during standby reception are limited to a portion of the reception circuit 20, which makes it possible to reduce active electric power.

The narrow band detection-determination unit 22 performs narrow band detection by the narrow band filter 27, thereby making it possible to achieve reception detection at low electric power with being less affected by noise.

A wide band signal (the normal transmission data S11) such as a signal specified by ISO/IEC1798 is more reliably detectable with use of the periodic signal S12 with the constant frequency or the narrow band modulation signal S13 by data having lower speed than the normal transmission data S11.

The determination circuit 28 of the narrow band detection-determination unit 22 outputs the determination signal S2 that is turned to High upon exceeding a determination threshold value as illustrated in FIG. 8.

First Operation Example

FIG. 10 illustrates a first operation example of the communication system 100.

FIG. 10 illustrates an operation example in which the transmission operation and the reception operation are continuously performed.

It is possible for the standby device and the calling device to decrease an average current during standby reception through turning on a minimum of blocks. The standby device and the calling device turn off the analog switch 13 of the transmission circuit 10 and turn on the analog switch 23 of the reception circuit 20 during standby reception. The standby device and the calling device may turn off the transmission unit 11, the periodic signal-narrow band signal generator 12, the bandpass filter 25 and the AD converter 26 of the reception unit 21, the modulator-demodulator 40, and the system control circuit 50 during standby reception.

In a case where the standby device determines that the significant signal from the calling device is present or the significant signal change is present, the standby device shifts from a standby reception state to the normal data communication (a transmission-reception state of the normal transmission data S11). Likewise, in a case where the calling device determines that the significant signal from the standby device is present or the significant signal change, the calling device shifts from the standby reception state to the normal data communication (the transmission-reception state of the normal transmission data S11).

The standby device turns on the analog switch 13 of the transmission circuit 10 and turns off the analog switch 23 of the reception circuit 20 upon shift to the normal data communication to transmit the periodic signal S12 or the narrow band modulation signal S13 to the calling device. In this case, the standby device turns on the transmission unit 11 and the periodic signal-narrow band signal generator 12.

The standby device and the calling device may turn off the periodic signal-narrow band signal generator 12 and the narrow band detection-determination unit 22 during the normal data communication (the reception state of the normal transmission data S11).

Second Operation Example

FIG. 11 illustrates a second operation example of the communication system 100.

FIG. 11 illustrates an operation example in which the transmission operation and the reception operation are intermittently performed.

As with the operation example in FIG. 11, the standby device may intermittently repeat the reception operation during standby reception. The calling device may intermittently repeat the transmission operation and the reception operation during standby reception.

In the operation example in FIG. 11, a repeating interval of the reception operation in the standby device is set to about three times a repeating interval Ta of the transmission operation and the reception operation in the calling device. In this case, it is possible for the standby device to receive the periodic signal S12 or the narrow band modulation signal S13 from the calling device once every three times. It is to be noted that setting of the repeating intervals of the operations in the standby device and the calling device is not limited to this example, and any other repeating intervals may be adopted.

In the operation example in FIG. 11, an average time until detection by the standby device is longer, as compared with the operation example in FIG. 10, but it is possible to reduce electric power consumption, as compared with the operation example in FIG. 10.

Other operations may be substantially similar to the operation example in FIG. 10.

Third Operation Example

A transmission-reception signal before shifting to the normal data communication (the transmission-reception state of the normal transmission data S11) may be the periodic signal S12 with the constant frequency, and may have a same frequency f1 in the calling device and the standby device.

FIG. 12 illustrates a third operation example of the communication system 100.

In the operation example in FIG. 12, in the calling device and the standby device, the periodic signal S12 with the same frequency f1 is used as a signal to be transmitted in an operation other than the normal data communication.

The calling device and the standby device may set a filter frequency of the narrow band filter narrow band 27 of the narrow band detection-determination unit 22 to the fixed frequency f1 during standby reception.

Other operations may be substantially similar to those in the operation example in FIG. 10.

Fourth Operation Example

FIG. 13 illustrates a fourth operation example of the communication system 100.

The periodic signal S12 with a plurality of frequencies is usable for a transmission-reception signal before shifting to the normal data communication, and it may be possible to allocate an inherent frequency to each of a plurality of standby devices.

The calling device transmits the periodic signal S12 with a frequency allocated to the standby device as a communication target, and adjusts a frequency for narrow band detection to the frequency allocated to the standby device as the communication target.

In the operation example in FIG. 13, three standby devices, that is, first, second, and third devices are provided, and one standby device is provided as the standby device as the communication target for the calling device.

The frequency allocated to the first device is f1. The frequency allocated to the second device is f2. The frequency allocated to the third device is f3.

The operation example in FIG. 13 indicates an operation example in a case where the calling device transmits the periodic signal S12 with the frequency f1 to call the first device. In the operation example in FIG. 13, it is possible for the calling device to specify a desired standby device by the frequency before the normal data communication; therefore, it is not necessary for the calling device to communicate with undesired standby devices. Accordingly, reaction times of the calling operation and standby operation are not unnecessarily increased, and electric power consumption is not unnecessarily increased. In order to enable this operation, the calling device stores information about frequency allocation to the standby devices in, for example, the PMU 71. Moreover, the calling device makes the periodic signal generated by the periodic signal-narrow band signal generator 12 and the frequency for the narrow band detection detected by the narrow band detection-determination unit 22 variable.

Other operations may be substantially similar to those in the operation example in FIG. 12.

Fifth Operation Example

The calling device may have a plurality of communication targets and may be allowed to alternately transmit and receive a plurality of frequencies corresponding to attributes of the communication targets in a time-divisional manner.

FIG. 14 illustrates a fifth operation example of the communication system 100.

In the operation example in FIG. 14, three standby devices, that is, first, second, and third devices are provided, and two standby devices are provided as communication targets for the calling device.

In the operation example in FIG. 14, the calling device first transmits the periodic signal S12 with the frequency f1 to call the first device and perform normal data communication with the first device. The operation example indicates an operation example in a case where the calling device subsequently transmits the periodic signal S12 with the frequency f2 to call the second device and perform the normal data communication with the second device.

In the operation example in FIG. 14, the calling device alternately calls the two standby devices in a time divisional manner, which thereby causes delay in the reaction times of the calling operation and the standby operation, as compared with the operation example in FIG. 13; however, it is possible to specify the desired standby device before the normal data communication, and it is not therefore necessary for the calling device to communicate with the undesired standby devices.

It is to be noted that in the operation example in FIG. 14, two standby devices are provided as the communication targets for the calling device, but the number of communication targets may be increased to three or more.

Other operations may be substantially similar to those in the operation example in FIG. 13.

Sixth Operation Example

The transmission-reception signal before shifting to the normal data communication may be the narrow band modulation signal S13, and inherent data may be allocated to a plurality of standby devices.

The calling device may transmit the narrow band modulation signal S13 by the inherent data allocated to the standby device as a communication target, and may start the normal data communication in a case where data of the narrow band modulation signal S13 returned from the standby device is data allocated to the data of the standby device as the communication target.

FIG. 15 illustrates a sixth operation example of the communication system 100.

In the operation example in FIG. 15, as with the operation example in FIG. 13, three standby devices, that is, first, second, and third devices are provided, and one standby device is provided as a communication target for the calling device.

Data allocated to the first device is d1. Data allocated to the second device is d2. Data allocated to the third device is d3.

A data length of data included in the narrow band modulation signal S13 is, for example, 4 bits, and a format of the data includes, for example, a start bit, a stop bit, an adding parity, etc. Specifically, for example, the data d1, d2, and d3 have the following values. Note that the data d1, d2, and d3 are not limited to this example, and may use any other values, and may be data other than 4-bit data.

d1: 0001
d2: 0010
d3: 0011

The operation example in FIG. 15 indicates an operation example in a case where the calling device transmits the narrow band modulation signal S13 of the data d1 to call the first device. In the operation example in FIG. 15, it is possible for the calling device to specify the desired standby device by the value of the data of the narrow band modulation signal S13 before the normal data communication; therefore, it is not necessary for the calling device to communicate with undesired standby devices. Accordingly, reaction times of the calling operation and standby operation are not unnecessarily increased, and electric power consumption is not unnecessarily increased. In order to enable this operation, the calling device stores information about allocation of data values of the narrow band modulation signal S13 to the standby devices in, for example, the PMU 71.

Other operations may be substantially similar to those in the operation example in FIG. 10. It is to be noted that the number of standby devices as the communication targets for the calling device may be increased to two or more substantially similarly to the operation example in FIG. 14.

Seventh Operation Example

Both the periodic signal S12 and the narrow band modulation signal S13 may be used as the transmission-reception signal before shifting to the normal data communication.

The operation examples in FIGS. 12 to 15 each indicate an example in which one of the periodic signal S12 or the narrow band modulation signal S13 is used as the transmission-reception signal before shifting to the normal data communication; however, both the periodic signal S12 and the narrow band modulation signal S13 may be mixed.

FIG. 16 illustrates a seventh operation example of the communication system 100.

In the operation example in FIG. 16, as with the operation examples in FIGS. 13 and 15, three standby devices, that is, first, second, and third devices are provided, and one standby device is provided as the communication target for the calling device.

In the operation example in FIG. 16, an inherent frequency and inherent data are allocated to each of the plurality of standby devices.

The frequency and the data allocated to the first device are respectively f1 and d1. The frequency and the data allocated to the second device are respectively f2 and d2. The frequency and the data allocated to the third device are respectively f3 and d3. The values of the data d1, d2, and d3 may be substantially similar to those in the operation example in FIG. 15.

The operation example in FIG. 16 indicates an operation example in which the calling device transmits the narrow band modulation signal S13 of the data d1 substantially similarly to the operation example in FIG. 15 to call the first device and the first device transmits the periodic signal S12 with the frequency f1 in response to this substantially similarly to the operation example in FIG. 13.

It is to be noted that conversely to the operation example in FIG. 16, the calling device may transmit the periodic signal S12 with the frequency f1 substantially similarly to the operation example in FIG. 13 to call the first device and the first device may transmit the narrow band modulation signal S13 of the data d1 substantially similarly to the operation example in FIG. 15.

According to the operation example in FIG. 16, for example, attribute information such as devices, communication, and applications are defined, and the attribute information is included in data of the frequency of the periodic signal S12 and the narrow band modulation signal S13, which makes it possible to perform simple authentication, etc. before shifting to the normal data communication.

Other operations may be substantially similar to those in the operation example in FIG. 13 or FIG. 15. It is to be noted that the number of standby devices as the communication targets for the calling device may be increased to two or more substantially similarly to the operation example in FIG. 14.

Eighth Operation Example

Communication between the calling device and the standby device by the periodic signal S12 or the narrow band modulation signal S13 may be executed in advance of association in the normal data communication.

International standards of electric field communication (intra-body communication) include ISO/IEC 17982 and ECMA-401 CCCC PHY. CCCC is an abbreviation of Close Capacitive Coupling Communication. Both the standards have same contents. In specifications of the above-described international standards, association is first performed in two steps in a case where data communication is performed between communication apparatuses.

FIGS. 17, 18, and 19 illustrate an eighth operation example of the communication system 100. FIGS. 17, 18, and 19 each illustrate an example of operation timings in a case where the communication system according to the present embodiment is applied to the above-described international standards.

In the communication system according to the present embodiment, in a case where association is performed from the beginning according to the above-described international standards, it is necessary to fully operate circuits necessary for the normal data communication such as the transmission unit 11, the reception unit 21, and the system control circuit 50, and electric power efficiency during standby is not sufficient. Hence, the calling operation and the standby operation using the periodic signal S12 (CW) or the narrow band modulation signal S13 in the present embodiment described above may be executed before association in the normal data communication. Accordingly, the periodic signal S12 or the narrow band modulation signal S13 may be transmitted from the calling device to wake up the standby device, and after a lapse of an LBT (Listen Before Talk) period, normal association may start. Thus, the electric power efficiency during standby is improved.

It is to be noted that in FIG. 17, a first association request (Association Request) represents Assoc. req-1, and a second association request represents Assoc. req-2. Moreover, a first association response (Association Response) represents Assoc. resp-1, and a second association response represents Assoc. resp-2.

Moreover, in FIGS. 17 to 19, transmission of the periodic signal S12 from the calling device represents CW-req. Moreover, a response to CW-req from the standby device represents CW-resp. Further, in FIGS. 17 to 19, a CW transmitter (CWTx) corresponds to the periodic signal-narrow band signal generator 12 and the transmission unit 11 in FIG. 5. Furthermore, in FIGS. 17 to 19, a CW receiver (CWRx) corresponds to the amplifier 24 of the reception unit 21 and the narrow band detection-determination unit 22 in FIG. 5. Moreover, in FIGS. 17 to 19, a CCCC transceiver (CCCCTx/Rx) corresponds to the transmission unit 11, the reception unit 21, the modulator-demodulator 40, and the system control circuit 50.

Further, in FIGS. 17 to 19, the calling device represents Talker and the standby device represents Listener.

As illustrated in the operation examples in FIGS. 17 to 19, a CW-resp transmission start timing may start immediately after detection of the CW-req. Moreover, as illustrated in FIGS. 18 and 19, "(CW-resp transmission period)>2*(CW-req transmission period)" is preferable. In other words, the CW-resp transmission period is preferably longer than twice the CW-req transmission period. This makes it possible for the Talker to detect the CW-resp even if the CW-req transmission period and the W-resp transmission period partially overlap each other.

The following two are considered as signal frequencies upon wakeup before association; however, there may be a case where the Talker detects the CW-req from another Talker. Accordingly, (1) is preferable.

$CW\text{-req}=CW\text{-resp}$ (1)

$CW\text{-req}\neq CW\text{-resp}$ (2)

1.3 Characteristics of Narrow Band Filter

FIG. 20 illustrates a characteristic example of an analog discrete-time bandpass filter. In FIG. 20, a horizontal axis indicates frequency, and a vertical axis indicates signal voltage.

The narrow band filter 27 of the narrow band detection-determination unit 22 may include the analog discrete-time bandpass filter. The analog discrete-time bandpass filter may be an N-path Filter.

In a case where the narrow band filter 27 includes, for example, an AD converter and a digital filter, saturation of the AD converter causes suppression of a weak periodic signal. The narrow band filter 27 including the analog filter makes it possible to increase a dynamic range of a signal, which makes it possible to detect the periodic signal S12 or the narrow band modulation signal S13 at high sensitivity without saturation by noise. Moreover, the narrow band filter 27 being a discrete-time filter makes it possible to accurately set a center frequency by a clock frequency.

1.4 Effects

As described above, according to the present embodiment, the second transmission signal including at least one of the periodic signal S12 with the constant frequency or the narrow band modulation signal S13 by data having lower speed than the normal transmission data S11 is detected in the narrow band, presence or absence of the significant signal or presence or absence of the significant signal change is determined, and electric power of the transmission circuit 10 and the reception circuit 20 is controlled on the basis of a result of such determination, which makes it possible to reduce electric power consumption.

According to the present embodiment, it is possible to largely reduce electric power consumption of the calling device and the standby device in the electric field communication and to increase battery duration. It is possible not only to reduce electric power consumption through using contact of the human body 30 as a trigger such as a case of application to the doorknob 91 but also to reduce electric power consumption until the normal data communication even in a case, such as the wristband, where the method is not applicable.

It is to be noted that the effects described in the description are merely illustrative and non-limiting, and other effects may be included. This applies to effects achieved by the following other embodiments.

2. Second Embodiment

Next, description is given of a communication system according to a second embodiment of the present disclosure. It is to be noted that components substantially same as those of the communication system according to the foregoing first embodiment are denoted by same reference numerals, and description thereof is omitted as appropriate.

2.1 Configuration of Communication System According to Second Embodiment

In the communication system 100 illustrated in FIG. 3, at least one of the first communication apparatus 110 or the second communication apparatus 120 may have a loopback function.

A basic configuration of the communication system according to the present embodiment may be substantially similar to that of the communication system 10 according to the foregoing first embodiment, except for a portion related to the loopback function.

FIG. 21 schematically illustrates an example of a circuit configuration during loopback of the second communication apparatus 120 (or the first communication apparatus 110) in the communication system according to the present embodiment.

In the following, description is given mainly of the second communication apparatus 120; however, the first communication apparatus 110 may have a substantially similar configuration.

The second communication apparatus 120 is enabled to simultaneously perform an operation of transmitting the periodic signal S12 as a transmission signal and an operation of receiving the periodic signal S12. Moreover, the second communication apparatus 120 is enabled to perform loopback of the transmission signal (the periodic signal S12) from the transmission circuit 10 to the reception circuit 20 of the second communication apparatus 120. The second communication apparatus 120 is enabled to continuously or intermittently repeat a loopback operation.

The second communication apparatus 120 turns on both the analog switch 13 of the transmission circuit 10 and the analog switch 23 of the reception circuit 20 during loopback. This makes it possible to perform loopback of the transmission signal (the periodic signal S12) from the transmission circuit 10 to the reception circuit 20 of the second communication apparatus 120.

The second communication apparatus 120 may turn off the bandpass filter 25 and the AD converter 26 of the reception unit 21 and the modulator-demodulator 40, and the system control circuit 50 during loopback.

The reception circuit 20 has a function of determining presence or absence of significant signal change in the narrow band detection signal S14 caused with change in capacity of the antenna unit 125 (the human body electrode 121 and the spatial electrode 122).

The second communication apparatus 120 has a function of activating the system control circuit 50 in a case where presence of significant signal change in the reception circuit 20 is determined. Moreover, in a case where absence of significant signal change in the reception circuit 20 is determined, the second communication apparatus 120 turns functions other than functions corresponding to the periodic signal S12 in the transmission circuit 10, the reception circuit 20, the oscillation circuit 60, and the demodulation circuit 42 to a standby state or a suspension state.

Other configurations may be substantially similar to those in the communication system according to the foregoing first embodiment.

2.2 Operation of Communication System According to Second Embodiment

FIG. 22 illustrates an example of the capacity generated in the antenna unit 125 (the human body electrode 121 and the spatial electrode 122) during loopback. FIG. 23 illustrates an example of change in waveform of the transmission signal (the periodic signal S12) caused during loopback.

In FIGS. 22 and 23, the periodic signal S12 to be transmitted as a transmission signal from the transmission circuit 10 represents a periodic signal S12(A). Moreover, in FIGS. 22 and 23, the periodic signal S12 to be looped back and be inputted to the narrow band detection-determination unit 22 represents a periodic signal S12(B).

As illustrated in FIG. 22, upon contact of the hand 31 with the human body electrode 121 (111), an electrode capacity C is increased by an additional capacity ΔC via the hand 31. A waveform of the looped-back transmission signal is changed with change in the electrode capacity C caused by contact of the hand 31 with the human body electrode 121 (111). As change in waveform, change in amplitude and waveform delay may occur.

For example, as illustrated in an upper section of FIG. 23, a waveform of the looped-back periodic signal S12(B) is delayed from the original periodic signal S12(A) by contact of the hand 31 with the human body electrode 121 (111). Such waveform delay may be detected as significant signal change by the narrow band detection-determination unit 22. In a case where significant signal change is detected, the PMU 71 activates the system control circuit 50 and circuits necessary for reception or reception of the normal transmission data S11 in the standby state to shift to the normal data communication.

In the normal data communication, during reception, the analog switch 13 of the transmission circuit 10 may be turned off, and the analog switch 23 of the reception circuit 20 may be turned on, thereby turning off the transmission unit 11, the periodic signal-narrow band signal generator 12, and the narrow band detection-determination unit 22, as illustrated in a lower-left section of FIG. 23.

In the normal data communication, during transmission, the analog switch 13 of the transmission circuit 10 may be turned on and the analog switch 23 of the reception circuit 20 may be turned off, thereby turning off the periodic signal-narrow band signal generator 12, the reception unit 21, and the narrow band detection-determination unit 22, as illustrated in a lower right section of FIG. 23.

As described above, according to the communication system according to the present embodiment, contact of the human body 30 is detectable as change in capacity of the antenna unit (electrode), thereby leading to not only reduction in electric power consumption but also avoidance of unintended communication in a case of no contact.

Other operations and effects may be substantially similar to those in the communication system according to the foregoing first embodiment.

2.3 Specific Example of Narrow Band Filter in Communication System According to Second Embodiment The narrow band filter 27 may include a multiplier that multiplies the transmitted periodic signal S12 with the constant frequency by a detection periodic signal S15 with a substantially same frequency as that of the periodic signal S12 and a lowpass filter that receives the periodic signal S12 multiplied by the detection periodic signal S15.

FIG. 24 illustrates a first configuration example of the narrow band filter 27 according to the second embodiment.

The narrow band filter 27 may include an amplifier 80, a periodic signal generator 81, an LPF (lowpass filter) 82, and a mixer 83 as a multiplier.

FIG. 25 illustrates a second configuration example of the narrow band filter 27 according to the second embodiment.

The narrow band filter 27 may include an analog switch 84 as a multiplier, an amplifier 80, a periodic signal generator 81, and an LPF 82.

In the configuration example in FIG. 24 or FIG. 25, the amplifier 80 may be shared with the amplifier 24 of the reception unit 21. The periodic signal generator 81 may be shared with the periodic signal-narrow band signal generator 12 of the transmission circuit 10. The LPF 82 may include, for example, an operational amplifier. The analog switch 84 may be shared with the analog switch 23 of the reception circuit 20.

In the narrow band filter 27 according to the configuration example in FIG. 24 or FIG. 25, the detection periodic signal S15 with a frequency that is the same as or slightly deviated from the frequency of the transmitted periodic signal S12 is generated by the periodic signal generator 81. Thereafter, the mixer 83 or the analog switch 84 multiplies the periodic signal S12 by the detection periodic signal S15 to change the frequency of the periodic signal S12 to near DC, and then the periodic signal S12 is caused to pass through the LPF 82 having a low cut-off frequency. Thus, it is possible to perform detection.

2.4 Modification Examples of Communication System According to Second Embodiment In the following, description is given mainly of the second communication apparatus 120; however, the first communication apparatus 110 may have a substantially similar configuration.

First Modification Example

FIG. 26 illustrates a circuit configuration example according to a first modification example of the second embodiment.

The transmission circuit 10 may include a variable output resistor 15. The reception circuit 20 may include a variable input resistor 29. A resistance value (a transmission output resistance value Ro) of the variable output resistor 15 of the transmission circuit 10 is desirably larger than a resistance value (a reception input resistance value Ri) of the variable input resistor 29 of the reception circuit 20.

The second communication apparatus 120 sets the resistance value (the transmission output resistance value Ro) of the variable output resistor 15 and the resistance value (the reception input resistance value Ri) of the variable input resistor 29 to a high value during transmission and reception of the periodic signal S12, which makes it easier to detect change in capacity of the antenna unit 125 (the human body electrode 121 and the spatial electrode 122).

The second communication apparatus 120 desirably sets the resistance value (the transmission output resistance value Ro) of the variable output resistor 15 and the resistance value (the reception input resistance value Ri) of the variable input resistor 29 to a low value during transmission and reception of the normal transmission data S11.

(During Loopback)

In a case where change in capacity is detected by loopback, waveform delay from transmission to reception as illustrated in FIG. 23 depends on change in time constant from RoC to Ro(C+ΔC); however, the additional capacity ΔC is not so large for detection of waveform delay. Therefore, it is desirable to increase the transmission output resistance value Ro to a certain extent during loopback. Moreover, the additional capacity ΔC is small; therefore, it is desirable to increase the input resistance value Ri during loopback.

(During Transmission of Normal Data)

During transmission of normal data, a voltage drop by the transmission output resistance value Ro leads to a decrease in transmission output; therefore, it is desirable to decrease the transmission output resistance value Ro as low as possible (close to 0).

(During Reception of Normal Data)

During reception of normal data, a larger reception input resistance value Ri causes an increase in reception amplitude but also causes an increase in noise; therefore, it is desirable to decrease the reception input resistance value Ri to a certain extent, which makes it possible to suppress low-frequency noise (a commercial power source, a fluorescent lamp, etc.).

As described above, optimum values of the transmission output resistance value Ri and the reception input resistance value Ro differ in respective operation modes during loopback, during transmission of normal data, and during reception of normal data. It is desirable to make the transmission output resistance value Ri and the reception input resistance value Ro variable so as to allow the system control circuit 50 or the PMU 71 to set the optimum setting values corresponding to the operation modes.

Second Modification Example

The second communication apparatus 120 may detect a phase shift (waveform delay) of the periodic signal S12 from the transmission circuit 10 to the reception circuit 20 to detect change in capacity of the antenna unit 125 (the human body electrode 121 and the spatial electrode 122).

As illustrated in FIG. 22 and the upper section of FIG. 23 described above, the looped-back transmission signal may cause waveform delay by change in the electrode capacity C caused by contact of the hand 31 with the electrode (the human body electrode 121). FIGS. 24 and 25 each illustrate a circuit configuration example that detects the waveform delay; however, a circuit configuration in FIG. 27 may be adopted without limiting to the circuit configuration examples in FIGS. 24 and 25.

FIG. 27 illustrates a second modification example of the second embodiment.

The narrow band filter 27 may include a delay circuit 85, the periodic signal generator 81, a binarization circuit 86, an XOR (eXclusive OR) circuit 87, and an integration circuit 88.

The delay circuit 85 is coupled to the periodic signal-narrow band signal generator 12 of the transmission circuit 10. The periodic signal S12(A) from the periodic signal-narrow band signal generator 12 is directly inputted to the delay circuit 85 without passing through the antenna unit 125 (the human body electrode 121 and the spatial electrode 122). The delay circuit 85 is provided for correction of circuit delay, and may be removed from the configuration. In a case where the delay circuit 85 is removed from the configuration, the periodic signal S12(A) from the periodic signal-narrow band signal generator 12 is directly inputted to the XOR circuit 87.

FIG. 28 illustrates an example of change in waveforms of output signals of respective components of the narrow band filter 27.

FIG. 28 illustrates an example of an output signal S21 of the delay circuit 85 (the periodic signal generator 81), an output signal S22 of the binarization circuit 86, an output signal S23 of the XOR circuit 87, and an output signal S24 of the integration circuit 88.

As with the example in FIG. 22, the looped-back periodic signal S12(B) from transmission circuit 10 is inputted to the narrow band detection-determination unit 22. The binarization circuit 86 outputs the output signal S22 obtained by binarization of the looped-back transmission signal (the periodic signal S12(B)).

The delay circuit 85 outputs the output signal S21 obtained through delaying the periodic signal S12(A) from the periodic signal-narrow band signal generator 12 of the transmission circuit 10. The XOR circuit 87 outputs the output signal S23 obtained through xoring the output signal S22 of the binarization circuit 86 and the output signal S21 of the delay circuit 85. Thus, a phase difference between the original periodic signal S12(A) and the looped-back periodic signal S12(B) is detected.

The integration circuit 88 outputs the output signal S24 obtained through integrating a signal value of the output signal S23 of the XOR circuit in a fixed time period. The integration circuit 88 periodically resets an integral value.

The determination circuit 28 of the narrow band detection-determination unit 22 outputs the determination signal S2 that is turned to High in a case where the output signal S24 of the integration circuit 88 exceeds a determination threshold value.

Third Modification Example

The second communication apparatus 120 may further include an inductor L that forms a resonant circuit with the capacity of the antenna unit 125 (the human body electrode 121 and the spatial electrode 122) during loopback.

The narrow band detection-determination unit 22 may detect change in amplitude of the periodic signal S12 by change in capacity of the antenna unit 125 (the human body electrode 121 and the spatial electrode 122) caused during loopback.

The second communication apparatus 120 turns on all the analog switch 13 of the transmission circuit 10, the analog switch 23 of the reception circuit 20, and the switch 89 during loopback.

The second communication apparatus 120 may turn off the bandpass filter 25 and the AD converter 26 of the reception unit 21, the modulator-demodulator 40, and the system control circuit 50 during loopback.

FIG. 30 illustrates an example of change in waveform of the transmission signal caused during loopback.

In FIGS. 29 and 30, the periodic signal S12 to be transmitted as a transmission signal from the transmission circuit 10 represents the periodic signal S12(A). Moreover, in FIGS. 29 and 30, the periodic signal S12 to be looped back and be inputted to the narrow band detection-determination unit 22 represents the periodic signal S12(B).

As illustrated in FIGS. 29 and 30, upon contact of the hand 31 with the human body electrode 121 (111), the electrode capacity C is increased by the additional capacity ΔC via the hand 31. Change in the electrode capacity C caused by contact of the hand 31 with the human body electrode 121 (111) causes change in oscillation frequency of an LC resonant circuit, thereby changing the waveform of the looped-back transmission signal. In the present modification example, as change in waveform, change in amplitude is detected.

Upon contact of the hand 31 with the electrode (the human body electrode 121), a voltage of the periodic signal S12(B) to be inputted to the narrow band detection-determination unit 22 is decreased. The narrow band detection-determination unit 22 adopts the periodic signal S12(B) as the narrow band detection signal S14, and detects change in amplitude of the periodic signal S12(B) (a voltage drop) as significant signal change.

The determination circuit 28 of the narrow band detection-determination unit 22 outputs the determination signal S2 that is turned to High in a case where a voltage drop of the periodic signal S12(B) exceeds a determination threshold value.

In a case where significant signal change is detected, the PMU 71 activates the system control circuit 50 and circuits necessary for reception or reception of the normal transmission data S11 in the standby state to shift to the normal data communication.

During the normal data communication, the switch 89 is turned off to separate the LC resonant circuit from the reception circuit 20.

3. Other Embodiments

Although the technology achieved by the present disclosure is not limited to description of the foregoing respective embodiments, and may be modified in a variety of ways.

For example, the present technology may have the following configurations.

(1)

A communication system provided with one or more communication apparatuses, each of the communication apparatus including:

an antenna unit;

a transmission circuit including a transmission unit and a signal generator, the transmission unit that selectively transmits, via the antenna unit, one of a first transmission signal including first transmission data or a second transmission signal including at least one of a periodic signal with a constant frequency or a narrow band modulation signal by data having lower speed than the first transmission data, and the signal generator that generates the second transmission signal;

a reception circuit including a reception unit, a narrow band detector, and a determination unit, the reception unit that receives the first transmission signal and the second transmission signal via the antenna unit, the narrow band detector that outputs a narrow band detection signal through detecting the second transmission signal in a narrow band, and the determination unit that determines presence or absence of a significant signal or presence or absence of significant signal change in the narrow band detection signal and outputs a determination signal; and an electronic power control circuit that controls electric power of the transmission circuit and the reception circuit on the basis of the determination signal.

(2)

The communication system according to (1), in which a plurality of the communication apparatuses are provided, the communication system further includes:

a calling device that includes a first communication apparatus of the plurality of the communication apparatus and uses at least one standby device as a communication target, and at least one standby device that includes a second communication apparatus of the plurality of the communication apparatus and uses the calling device as a communication target, the calling device has a function of transmitting the second transmission signal to the standby device in a fixed time period and a function of receiving the second transmission signal from the standby device in a fixed time period after a transmission operation in the fixed time period, and the calling device continuously or intermittently repeats an operation of transmitting the second transmission signal in the fixed time period and an operation of receiving the second transmission signal in the fixed time period, and performs transmission and reception of the first transmission signal to and from the standby device in a case where it is determined that the significant signal is present or the significant signal change is present in the second transmission signal from the standby device, and the standby device continuously or intermittently repeats reception of the second transmission signal from the calling device in a fixed time period, and performs transmission and reception of the first transmission signal to and from the calling device after transmission of the second transmission signal to the calling device in a case where it is determined that the significant signal is present or the significant signal change is present in the second transmission signal from the calling device.

(3)

The communication system according to (2), in which the second transmission signal to be transmitted by the calling device and the second transmission signal to be transmitted by the standby device are both periodic signals with a same frequency.

(4)

The communication system according to (2), in which a plurality of the standby devices are provided, one of inherent frequencies different from one another is allocated to each of the plurality of the standby devices, and the calling device transmits, as the second transmission signal, a periodic signal with a frequency allocated to a standby device as a communication target of the plurality of the standby devices to call at least one standby device of the plurality of the standby devices.

(5)

The communication system according to (4), in which the calling device transmits, as the second transmission signals to two or more standby devices as communication targets of the plurality of the standby devices, periodic signals with inherent frequencies allocated to the respective two or more standby devices as the communication targets in a time divisional manner, and the calling device transmits and receives the first transmission signal to and from the two or more standby devices in a time divisional manner in a case where it is determined that a significant signal is present or the significant signal change is present in the second transmission signals from the respective two or more standby devices.

(6)

The communication system according to (2), in which a plurality of the standby devices are provided, one of inherent data different from one another is allocated to each of the plurality of the standby devices, the calling device transmits, as the second transmission signals to two or more standby devices as communication targets of the plurality of the standby devices, narrow band modulation signals by the inherent data allocated to the respective two or more standby devices as communication targets in a time divisional manner, and the calling device transmits and receives the first transmission signal to and from the two or more standby devices in a time divisional manner in a case where it is determined that a significant signal is present or the significant signal change is present in the second transmission signals from the respective two or more standby devices.

(7)

The communication system according to (2), in which communication using both the periodic signal with the constant frequency and the narrow band modulation signal as the second transmission signals is performed between the calling device and the standby device.

(8)

The communication system according to any one of (2) to (7), in which each of the calling device and the standby device has a function of performing association before transmission and reception of the first transmission signal between the calling device and the standby device, and performs transmission and reception of the second transmission signal between the calling device and the standby device before performing the association.

(9)

The communication system according to any one of (1) to (8), in which the narrow band detector includes an analog discrete-time bandpass filter.

(10)

The communication system according to (1), in which the communication apparatus has a function of simultaneously performing an operation of transmitting the periodic signal with the constant frequency as the transmission signal and an operation of receiving the periodic signal with the constant frequency to perform loopback of the periodic signal with the constant frequency from the transmission circuit to the reception circuit, and the reception circuit has a function of determining presence or absence of significant signal change in the periodic signal with the constant frequency caused by change in capacity of the antenna unit.

(11)

The communication system according to any one of (1) to (10), in which the narrow band detector includes a multiplier that multiplies the periodic signal with the constant frequency by a detection periodic signal with a substantially same frequency as the frequency of the periodic signal with the constant frequency, and a lowpass filter that receives the periodic signal multiplied by the detection periodic signal.

(12)

The communication system according to (10), in which the transmission circuit includes a variable output resistor, the reception circuit includes a variable input resistor having a resistance value larger than a resistance value of the variable output resistor, and during transmission and reception of the periodic signal with the constant frequency, the resistance value of the variable output resistor and the resistance value of the variable input resistor are increased, as compared with these resistance values during transmission and reception of the first transmission signal.

(13)

The communication system according to (10), in which the reception circuit detects waveform delay of the periodic signal with the constant frequency by change in capacity of the antenna unit.

(14)

The communication system according to (10), in which the communication apparatus further includes an inductor that forms a resonant circuit with the capacity of the antenna unit during the loopback.

(15)

The communication system according to any one of (1) to (14), in which the communication apparatus is an electric field communication apparatus, and the antenna unit includes a human body electrode and a spatial electrode that perform communication via a human body by an electric field mode.

(16)

A communication apparatus including an antenna unit;

a transmission circuit including a transmission unit and a signal generator, the transmission unit that selectively transmits, via the antenna unit, one of a first transmission signal including first transmission data or a second transmission signal including at least one of a periodic signal with a constant frequency or a narrow band modulation signal by data having lower speed than the first transmission data, and the signal generator that generates the second transmission signal;

a reception circuit including a reception unit, a narrow band detector, and a determination unit, the reception unit that receives the first transmission signal and the second transmission signal via the antenna unit, the narrow band detector that outputs a narrow band detection signal through detecting the second transmission signal in a narrow band, and the determination unit that determines presence or absence of a significant signal or presence or absence of significant signal change in the narrow band detection signal and outputs a determination signal; and an electronic power control circuit that controls electric power of the transmission circuit and the reception circuit on the basis of the determination signal.

This application claims the benefit of Japanese Priority Patent Application No. 2016-121716 filed with the Japan Patent Office on Jun. 20, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A communication system comprising:
a plurality of communication apparatuses, wherein each of the plurality of communication apparatuses comprises:
an antenna unit;
a transmission circuit that comprises:
a transmission unit configured to selectively transmit, via the antenna unit, one of a first transmission signal or a second transmission signal, wherein
the first transmission signal includes first transmission data, and
the second transmission signal includes at least one of a periodic signal with a constant frequency or a narrow band modulation signal that has lower speed than the first transmission data; and
a signal generator configured to generate the second transmission signal;
a reception circuit that comprises:
a reception unit configured to receive the first transmission signal and the second transmission signal via the antenna unit;
a narrow band detector configured to output a narrow band detection signal based on a detection of the second transmission signal in a narrow band; and
a determination unit configured to:
determine presence or absence of a significant signal or presence or absence of a significant signal change in the narrow band detection signal;
determine presence of a significant signal change in the periodic signal with the constant frequency based on a change in capacity of the antenna unit; and
output a determination signal based on the determination of the presence of the significant signal or the significant signal change in the narrow band detection signal and the determination of the presence of the significant signal change in the periodic signal with the constant frequency; and
an electronic power control circuit configured to control electric power of the transmission circuit and the reception circuit based on the determination signal.

2. The communication system according to claim 1, wherein the communication system further includes:
a calling device that includes a first communication apparatus of the plurality of the communication apparatuses; and
a plurality of standby devices, wherein
each of the plurality of standby devices includes a second communication apparatus of the plurality of communication apparatuses,
the calling device is configured to:
transmit the second transmission signal to a standby device of the plurality of standby devices in a first fixed time period;
receive the second transmission signal from the standby device in a second fixed time period after the transmission of the second transmission signal in the first fixed time period;
continuously or intermittently repeat the transmission of the second transmission signal in the first fixed time period and the reception of the second transmission signal in the second fixed time period; and
transmit and receive the first transmission signal to and from the standby device based on the determination of the presence of the significant signal or the significant signal change in
the second transmission signal from the standby device, and the standby device is configured to:
continuously or intermittently receive of the second transmission signal from the calling device in a third fixed time period; and
transmit and receive the first transmission signal to and from the calling device after transmission of the second transmission signal to the calling device based on the determination of the presence of the significant signal or the significant signal change in the second transmission signal from the calling device.

3. The communication system according to claim 2, wherein the second transmission signal to be transmitted by the calling device and the second transmission signal to be transmitted by the standby device are periodic signals with a same frequency.

4. The communication system according to claim 2, wherein
one of a plurality of different inherent frequencies is allocated to each of the plurality of the standby devices, and
the calling device is further configured to transmit, as the second transmission signal, a periodic signal with an inherent frequency of the plurality of different inherent frequencies allocated to the standby device to call at least one standby device of the plurality of standby devices.

5. The communication system according to claim 4, wherein the calling device is further configured to:
transmit, as a plurality of second transmission signals to at least two standby devices of the plurality of the standby devices, a plurality of periodic signals with inherent frequencies of the plurality of different inherent frequencies allocated to a respective of the at least two standby devices in a time divisional manner; and
transmit and receive the first transmission signal to and from the at least two standby devices in the time divisional manner based on the determination of the presence of the significant signal or the significant signal change in the plurality of second transmission signals from the respective of the at least two standby devices.

6. The communication system according to claim 2, wherein
one of a plurality of different inherent data is allocated to each of the plurality of the standby devices, the calling device is further configured to:
transmit, as a plurality of second transmission signals to at least two standby devices of the plurality of the standby devices, a plurality of narrow band modulation signals by the plurality of different inherent data allocated to a respective of the at least two standby devices in a time divisional manner; and
transmit and receive the first transmission signal to and from the at least two standby devices in the time divisional manner based on the determination of the presence of the significant signal or the significant signal change in the plurality of second transmission signals from the respective of the at least two standby devices.

7. The communication system according to claim 2, wherein the second transmission signal includes both of the periodic signal with the constant frequency and the narrow band modulation signal.

8. The communication system according to claim 2, wherein each of the calling device and the standby device are configured to:
associate the calling device with the standby device before the transmission and the reception of the first transmission signal between the calling device and the standby device; and
transmit and receive the second transmission signal between the calling device and the standby device before the association of the calling device and the standby device.

9. The communication system according to claim 2, wherein the narrow band detector includes an analog discrete-time bandpass filter.

10. The communication system according to claim 1, wherein
a communication apparatus of the plurality of communication apparatuses is configured to simultaneously transmit the periodic signal with the constant frequency as the second transmission signal and receive the periodic signal with the constant frequency to perform loopback of the periodic signal with the constant frequency from the transmission circuit to the reception circuit.

11. The communication system according to claim 1, wherein the narrow band detector includes:
a multiplier configured to multiply the periodic signal with the constant frequency by a detection periodic signal with a substantially same frequency as a frequency of the periodic signal with the constant frequency; and
a lowpass filter configured to receive the periodic signal multiplied by the detection periodic signal.

12. The communication system according to claim 10, wherein
the transmission circuit further comprises a variable output resistor that has a first resistance value,
the reception circuit further comprises a variable input resistor that has a second resistance value larger than the first resistance value, and
the first resistance value and the second resistance value are increased during the transmission and the reception of the periodic signal with the constant frequency, as compared with the first resistance value and the second resistance value during the transmission and the reception of the first transmission signal.

13. The communication system according to claim 10, wherein the reception circuit is further configured to detect waveform delay of the periodic signal with the constant frequency based on the change in the capacity of the antenna unit.

14. The communication system according to claim 10, wherein the communication apparatus further includes an inductor configured to form a resonant circuit with the capacity of the antenna unit during the loopback.

15. The communication system according to claim 1, wherein
each of the plurality of communication apparatuses is an electric field communication apparatus, and
the antenna unit includes a human body electrode and a spatial electrode that are configured to communicate via a human body by an electric field mode.

16. A communication apparatus, comprising:
an antenna unit;
a transmission circuit that comprises:
a transmission unit configured to selectively transmit, via the antenna unit, one of a first transmission signal or a second transmission signal, wherein
the first transmission signal includes first transmission data, and
the second transmission signal includes at least one of a periodic signal with a constant frequency or a narrow band modulation signal that has lower speed than the first transmission data; and
a signal generator configured to generate the second transmission signal;
a reception circuit that comprises:
a reception unit configured to receive the first transmission signal and the second transmission signal via the antenna unit;
a narrow band detector configured to output a narrow band detection signal based on a detection of the second transmission signal in a narrow band; and
a determination unit configured to:
determine presence or absence of a significant signal or presence or absence of a significant signal change in the narrow band detection signal;
determine presence of a significant signal change in the periodic signal with the constant frequency based on a change in capacity of the antenna unit; and
output a determination signal based on the determination of the presence of the significant signal or the significant signal change in the narrow band detection signal and the determination of the presence of the significant signal change in the periodic signal with the constant frequency; and
an electronic power control circuit configured to control electric power of the transmission circuit and the reception circuit based on the determination signal.

17. A communication system, comprising:
a plurality of communication apparatuses, wherein each of the plurality of communication apparatuses comprises:
an antenna unit;
a transmission circuit that comprises:
a transmission unit configured to selectively transmit, via the antenna unit, one of a first transmission signal or a second transmission signal, wherein
the first transmission signal includes first transmission data, and
the second transmission signal includes at least one of a periodic signal with a constant frequency or a narrow band modulation signal that has lower speed than the first transmission data; and a signal generator configured to generate the second transmission signal;

a reception circuit that comprises:

a reception unit configured to receive the first transmission signal and the second transmission signal via the antenna unit;

a narrow band detector configured to output a narrow band detection signal based on a detection of the second transmission signal in a narrow band; and a determination unit configured to:

determine presence or absence of a significant signal or presence or absence of a significant signal change in the narrow band detection signal; and output a determination signal based on the determination of the presence of the significant signal or the significant signal change in the narrow band detection signal; and an electronic power control circuit configured to control electric power of the transmission circuit and the reception circuit based on the determination signal, wherein a communication apparatus of the plurality of communication apparatuses is configured to simultaneously transmit the periodic signal with the constant frequency as the second transmission signal and receive the periodic signal with the constant frequency to perform loopback of the periodic signal with the constant frequency from the transmission circuit, the reception circuit is configured to determine presence of a significant signal change in the periodic signal with the constant frequency based on change in capacity of the antenna unit, and the communication apparatus includes an inductor configured to form a resonant circuit with the capacity of the antenna unit during the loopback.

\* \* \* \* \*